United States Patent
Sen et al.

(10) Patent No.: US 12,418,903 B2
(45) Date of Patent: Sep. 16, 2025

(54) GROUP COMMON DOWNLINK CONTROL INFORMATION ENHANCEMENTS FOR PARTIAL FREQUENCY SOUNDING OF MULTIPLE UES

(71) Applicant: QUALCOMM Incorporated, San Diego, CA (US)

(72) Inventors: Pinar Sen, San Diego, CA (US); Muhammad Sayed Khairy Abdelghaffar, San Jose, CA (US); Alexandros Manolakos, Escondido, CA (US); Yu Zhang, San Diego, CA (US); Runxin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 376 days.

(21) Appl. No.: 18/011,751

(22) PCT Filed: Sep. 4, 2020

(86) PCT No.: PCT/CN2020/113385
§ 371 (c)(1),
(2) Date: Dec. 20, 2022

(87) PCT Pub. No.: WO2022/047717
PCT Pub. Date: Mar. 10, 2022

(65) Prior Publication Data
US 2023/0254832 A1    Aug. 10, 2023

(51) Int. Cl.
*H04W 72/0453* (2023.01)
*H04L 5/00* (2006.01)
*H04W 72/23* (2023.01)

(52) U.S. Cl.
CPC ....... *H04W 72/0453* (2013.01); *H04L 5/0051* (2013.01); *H04W 72/23* (2023.01)

(58) Field of Classification Search
None
See application file for complete search history.

(56) References Cited

U.S. PATENT DOCUMENTS

| 10,666,408 B2 | 5/2020 | Shin et al. | |
|---|---|---|---|
| 2012/0106489 A1* | 5/2012 | Konishi | H04W 72/51 370/329 |

(Continued)

FOREIGN PATENT DOCUMENTS

| CN | 111277389 A | 6/2020 |
|---|---|---|
| EP | 3136641 A1 | 3/2017 |

(Continued)

OTHER PUBLICATIONS

Moderator (ZTE): "FL Summary #3 on SRS Enhancements", 3GPP TSG RAN WG1 Meeting #102-e, R1-2007234, 3rd Generation Partnership Project (3GPP), Mobile Competence Centre, 650, Route Des Lucioles, F-06921 Sophia-Antipolis Cedex, France, vol. RAN WG1, No. eMeeting, Aug. 17, 2020-Aug. 28, 2020, Aug. 28, 2020, XP051922820, 26 Pages, Section 5.1, sections 1-6.

(Continued)

*Primary Examiner* — Otis L Thompson, Jr.
(74) *Attorney, Agent, or Firm* — Loza & Loza, LLP

(57) ABSTRACT

Aspects of the disclosure relate to the use of enhanced downlink control information to communicate partial frequency sounding configuration to user equipment (UE). A UE may receive a partial frequency sounding configuration generated for the UE the downlink control information, transmit a sounding reference signal (SRS) in one or more resources configured for SRS transmission in a bandwidth used by the UE, the one or more resources being identified by the partial frequency sounding configuration, and refrain from transmitting in a portion of a set of resources configured for SRS transmission in the bandwidth used by the UE.

(Continued)

A format for the enhanced downlink control information may be based on standards defined the downlink control information formats.

10 Claims, 19 Drawing Sheets

(56) References Cited

U.S. PATENT DOCUMENTS

| | | | |
|---|---|---|---|
| 2015/0009951 A1* | 1/2015 | Josiam | H04L 25/0224 370/330 |
| 2017/0033908 A1 | 2/2017 | Hwang et al. | |
| 2018/0205440 A1* | 7/2018 | Enescu | H04B 7/0626 |
| 2019/0052424 A1 | 2/2019 | Manolakos et al. | |
| 2019/0200359 A1 | 6/2019 | Choi et al. | |
| 2019/0349964 A1* | 11/2019 | Liou | H04B 7/0626 |
| 2020/0059384 A1 | 2/2020 | Zhang et al. | |
| 2020/0119953 A1* | 4/2020 | Chen | H04W 52/325 |
| 2020/0120683 A1 | 4/2020 | Kakishima et al. | |
| 2020/0204406 A1* | 6/2020 | Zhang | H04B 7/0456 |
| 2020/0280404 A1* | 9/2020 | Qin | H04L 5/0048 |
| 2020/0413340 A1* | 12/2020 | Nam | H04W 52/028 |
| 2021/0084663 A1* | 3/2021 | Takeda | H04W 72/0446 |
| 2021/0105725 A1* | 4/2021 | Karjalainen | H04W 52/242 |
| 2021/0144703 A1* | 5/2021 | Jung | H04B 7/088 |
| 2021/0352631 A1* | 11/2021 | Fan | H04B 7/0626 |
| 2021/0359819 A1* | 11/2021 | Xiao | H04L 25/0226 |
| 2022/0200764 A1* | 6/2022 | You | H04L 5/0094 |
| 2022/0247467 A1* | 8/2022 | Huang | H04W 72/23 |
| 2023/0047048 A1* | 2/2023 | Liu | H04B 7/0417 |
| 2023/0085874 A1* | 3/2023 | Khoshnevisan | H04L 1/189 370/329 |
| 2023/0179368 A1* | 6/2023 | Nilsson | H04L 25/0204 370/329 |
| 2023/0189228 A1* | 6/2023 | Nilsson | H04W 72/0453 370/329 |

FOREIGN PATENT DOCUMENTS

| | | |
|---|---|---|
| EP | 4092946 A1 | 11/2022 |
| KR | 20120008473 A | 1/2012 |
| WO | 2021253303 A1 | 12/2021 |

OTHER PUBLICATIONS

Supplementary European Search Report—EP20951964—Search Authority—The Hague—Apr. 22, 2024.

International Search Report and Written Opinion—PCT/CN2020/113385—ISA/EPO—May 27, 2021.

ZTE: "Enhancements on SRS Flexibility, Coverage and Capacity", 3GPP TSG RAN WG1 Meeting #102-e, R1-2006963, 3rd Generation Partnership Project (3GPP), Mobile Competence Centre, 650, Route Des Lucioles, F-06921 Sophia-Antipolis Cedex, France, vol. RAN WG1, No. eMeeting, Aug. 17, 2020-Aug. 28, 2020, 10 Pages, Aug. 28, 2020 (Aug. 28, 2020), section 2, section 4.3, p. 1-p. 6 figures 3, 4.

FUTUREWEI: "Enhancements on SRS Flexibility, Coverage and Capacity", R1-2005288, 3GPP TSG RAN WG1 #102-e e-Meeting, 3rd Generation Partnership Project, Mobile Competence Centre, 650, Route Des Lucioles, F-06921 Sophia-antipolis Cedex, France, vol. RAN WG1, No. e-Meeting, Aug. 17, 2020-Aug. 28, 2020, Aug. 7, 2020, XP052346663, Aug. 17-28, 2020, 7 Pages.

VIVO: "Discussion on SRS Enhancement", 3GPP TSG RAN WG1 #102-e, R1-2005368, e-Meeting, Aug. 17-28, 2020, Aug. 8, 2020, 17 Pages, Section 5.

* cited by examiner

SRS Requests

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 00 | No aperiodic SRS resource set triggered | No aperiodic SRS resource set triggered |
| 01 | SRS resource set(s) configured by SRS-ResourceSet with higher layer parameter aperiodicSRS-ResourceTrigger set to 1 or an entry in aperiodicSRS-ResourceTriggerList set to 1 | SRS resource set(s) configured with higher layer parameter usage in SRS-ResourceSet set to 'antennaSwitching' and resourceType in SRS-ResourceSet set to 'aperiodic' for a 1st set of serving cells configured by higher layers |
| 10 | SRS resource set(s) configured by SRS-ResourceSet with higher layer parameter aperiodicSRS-ResourceTrigger set to 2 or an entry in aperiodicSRS-ResourceTriggerList set to 2 | SRS resource set(s) configured with higher layer parameter usage in SRS-ResourceSet set to 'antennaSwitching' and resourceType in SRS-ResourceSet set to 'aperiodic' for a 2nd set of serving cells configured by higher layers |
| 11 | SRS resource set(s) configured by SRS-ResourceSet with higher layer parameter aperiodicSRS-ResourceTrigger set to 3 or an entry in aperiodicSRS-ResourceTriggerList set to 3 | SRS resource set(s) configured with higher layer parameter usage in SRS-ResourceSet set to 'antennaSwitching' and resourceType in SRS-ResourceSet set to 'aperiodic' for a 3rd set of serving cells configured by higher layers |

700

FIG. 7

GROUP COMMON DOWNLINK CONTROL INFORMATION ENHANCEMENTS FOR PARTIAL FREQUENCY SOUNDING OF MULTIPLE UES

CROSS-REFERENCE TO RELATED APPLICATION(S)

This application is the U.S. national stage of PCT patent application number PCT/CN2020/113385 filed on Sep. 4, 2020, and assigned to the assignee hereof and hereby expressly incorporated by reference herein as if fully set forth below in its entirety and for all applicable purposes.

INTRODUCTION

The technology discussed below relates generally to wireless communication networks, and more particularly, to configuration of sounding reference signal (SRS) resources in beam-based communication scenarios.

In wireless communication systems, such as those specified under standards for 5G New Radio (NR), a base station and user equipment (UE) may utilize beamforming to compensate for high path loss and short range. Beamforming is a signal processing technique used with an antenna array for directional signal transmission and/or reception. Each antenna in the antenna array transmits a signal that is combined with other signals of other antennas of the same array in such a way that signals at particular angles experience constructive interference while others experience destructive interference.

The base station and the UE can select one or more beam pair links (BPLs) for communication therebetween on the downlink and/or the uplink. Each BPL includes corresponding transmit and receive beams on the base station and UE. For example, on the uplink, a BPL includes a transmit beam on the UE and a receive beam on the base station. The base station and UE may select one or more beams forming BPLs for communication of uplink and downlink signals therebetween using a downlink beam management scheme and/or an uplink beam management scheme. In an example of uplink beam management scheme, uplink beams (e.g., an uplink BPL) may be selected by the base station based on received beamformed uplink reference signals, such as SRSs. When the channel is reciprocal, the base station may further derive the downlink beams (e.g., a downlink BPL) to communicate with the UE based on the received SRSs.

The UE may transmit the SRSs in accordance with SRS resources configured by the base station. An SRS resource defines the time-frequency resource location and other parameters associated with transmission of the SRS. One or more SRS resources may be included in an SRS resource set that may be configured to enable aperiodic, semi-persistent, or periodic transmission of SRSs generated based on the SRS resources within the SRS resource set.

BRIEF SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method for wireless communication at a user equipment (UE) in a wireless communication network is disclosed. The method includes receiving downlink control information that includes a partial frequency sounding configuration for the UE, transmitting a sounding reference signal (SRS) in one or more resources configured for SRS transmission in a bandwidth used by the UE, the one or more resources being identified by the partial frequency sounding configuration, and refraining from transmitting in a portion of a set of resources configured for SRS transmission in the bandwidth used by the UE.

Another example provides a UE in a wireless communication network including a memory and a processor coupled to the memory. The processor and the memory can be configured to receive downlink control information that includes a partial frequency sounding configuration for the UE, transmit a SRS in one or more resources configured for SRS transmission in a bandwidth used by the UE, the one or more resources being identified by the partial frequency sounding configuration, and refrain from transmitting in a portion of a set of resources configured for SRS transmission in the bandwidth used by the UE.

Another example provides a UE in a wireless communication network. The UE can include means for receiving downlink control information that includes a partial frequency sounding configuration for the UE, means for transmitting a SRS in one or more resources configured for SRS transmission in a bandwidth used by the UE, the one or more resources being identified by the partial frequency sounding configuration, and means for refraining from transmitting in a portion of a set of resources configured for SRS transmission in the bandwidth used by the UE.

Another example provides a non-transitory computer-readable medium including code for causing one or more processors of a UE to receive downlink control information that includes a partial frequency sounding configuration for the UE, transmit a SRS in one or more resources configured for SRS transmission in a bandwidth used by the UE, the one or more resources being identified by the partial frequency sounding configuration, and refrain from transmitting in a portion of a set of resources configured for SRS transmission in the bandwidth used by the UE.

In another example, a method for wireless communication at a radio access network (RAN) entity in a wireless communication network is disclosed. The method includes configuring a SRS configuration to be used by at least one user equipment (UE), the SRS configuration including a plurality of frequency resources, generating partial frequency sounding configurations for a plurality of UEs, and transmitting the partial frequency sounding configurations in downlink control information, where each partial frequency sounding configuration defines one or more resources in the plurality of frequency resources to be used by a corresponding UE for transmitting an SRS.

Another example provides a RAN entity in a wireless communication network including a memory and a processor coupled to the memory. The processor and the memory can be configured to configure a SRS configuration to be used by at least one UE, the SRS configuration including a plurality of frequency resources, generate partial frequency sounding configurations for a plurality of UEs, and transmit the partial frequency sounding configurations in downlink control information, where each partial frequency sounding configuration defines one or more resources in the plurality of frequency resources to be used by a corresponding UE for transmitting an SRS.

Another example provides a RAN entity in a wireless communication network. The RAN entity can include means for configuring a SRS configuration to be used by at least one user equipment (UE), the SRS configuration including a plurality of frequency resources, means for generating partial frequency sounding configurations for a plurality of UEs, and means for transmitting the partial frequency sounding configurations in downlink control information, where each partial frequency sounding configuration defines one or more resources in the plurality of frequency resources to be used by a corresponding UE for transmitting an SRS.

Another example provides a non-transitory computer-readable medium including code for causing one or more processors of a RAN entity to configure a SRS configuration to be used by at least one UE, the SRS configuration including a plurality of frequency resources, generate partial frequency sounding configurations for a plurality of UEs, and transmit the partial frequency sounding configurations in downlink control information, where each partial frequency sounding configuration defines one or more resources in the plurality of frequency resources to be used by a corresponding UE for transmitting an SRS.

These and other aspects will become more fully understood upon a review of the detailed description, which follows. Other aspects, features, and examples will become apparent to those of ordinary skill in the art, upon reviewing the following description of specific, exemplary aspects of in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects, such exemplary aspects can be implemented in various devices, systems, and methods.

BRIEF DESCRIPTION OF THE DRAWINGS

FIG. 7 illustrates an example of SRS requests that can be transmitted by a base station to configure SRS transmissions in a 5G NR network.

DETAILED DESCRIPTION

Figure 1:
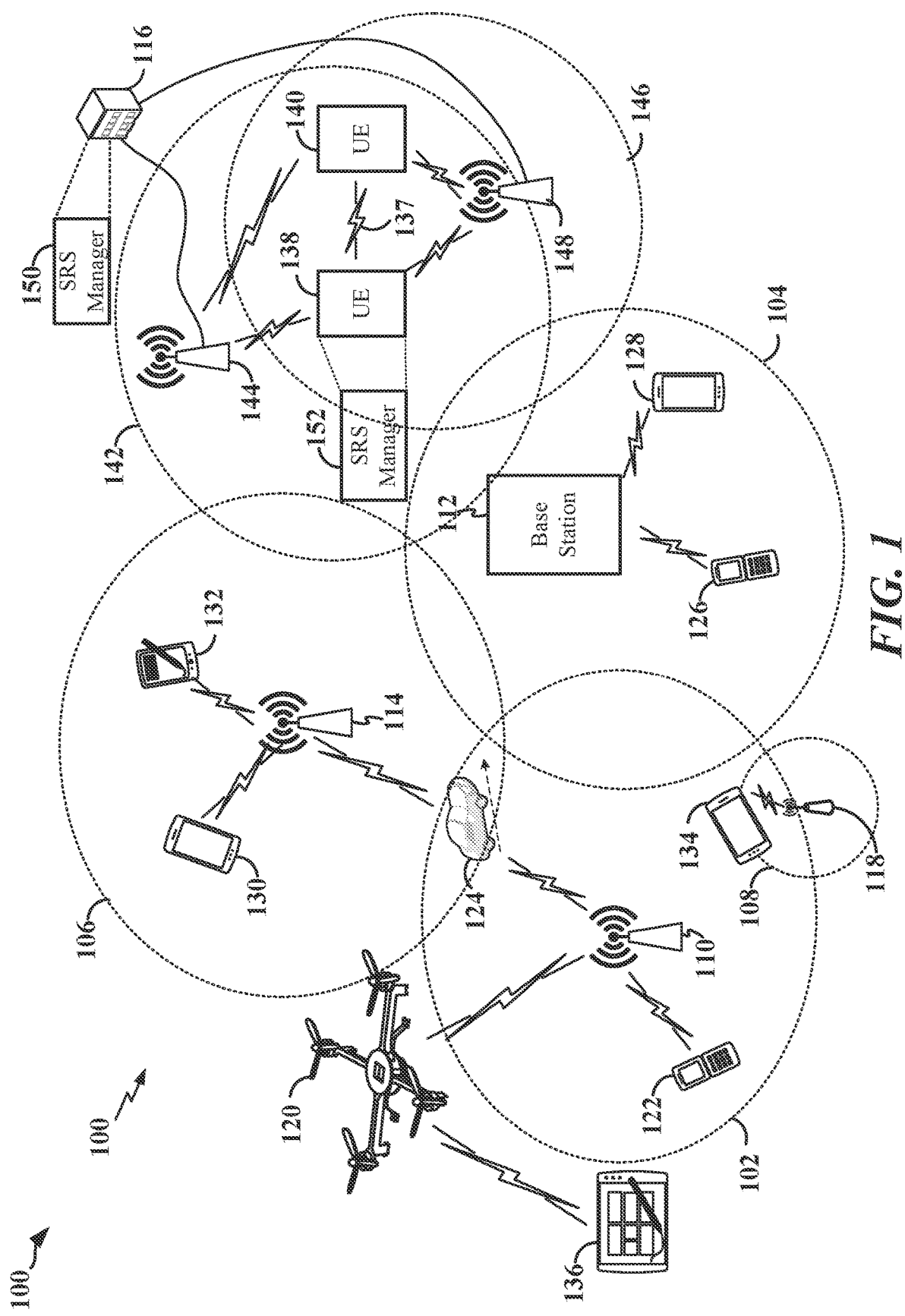
FIG. 1 is a conceptual illustration of an example of a radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30

GHZ-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects of the disclosure relate to configuration of a partial frequency sounding configuration that may be used when multiple UEs are multiplexed using the same frequency resources. For example, the partial frequency sounding configuration may identify frequency resources to be used by each UE for transmitting a sounding reference signal (SRS). A SRS configuration to be used by multiple UEs may define, configure or provision a set of frequency resources to be used for SRS. The set of frequency resources may be apportioned among the multiplexed UEs. The assignment of frequency resources to the UEs may be communicated in a partial frequency sounding configuration transmitted to each UE in downlink control information (DCI). For example, the partial frequency sounding configuration may define one or more frequency resources in the plurality of frequency resources to be used by a corresponding UE for transmitting an SRS.

The partial frequency sounding configuration may identify allocations of frequency resources to corresponding UEs through bitmaps or indices provided in the partial frequency sounding configuration. An index in a partial frequency sounding configuration may identify one or more resources in a corresponding preconfigured table.

A partial frequency sounding configuration may be transmitted in a block of the downlink control information identified with a corresponding UE. A partial frequency sounding configuration may be transmitted in downlink control information that has a format that is based on a group common downlink control information (GC-DCI) defined for use in a 5G NR network. The format of the downlink control information may be based on GC-DCI 2_3 Type A or GC-DCI 2_3 Type B. The downlink control information may be enhanced to include a partial frequency sounding field that includes a bitmap or index used to identify the one or more resources. The downlink control information may be enhanced to include a component carrier index used to indicate the component carrier set associated with the partial frequency sounding configuration.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, 106, 142, and 146, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element or entity in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology.

In FIG. 1, three base stations 110, 112, and 114 are shown in cells 102, 104, and 106, respectively; and a fourth base station 116 is shown controlling remote radio heads (RRHs) 144 and 148 in cells 142 and 146. That is, a base station can have an integrated antenna or can be connected to an antenna or RRH by feeder cables. In the illustrated example, the cells 102, 104, 106, 142, and 146 may be referred to as macrocells, as the base stations 110, 112, 114, and 116 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 116, and 118 provide wireless access points to a core network for any number of mobile apparatuses.

FIG. 1 further includes an unmanned aerial vehicle (UAV) 120, such as a quadcopter or drone, which may be configured to function as a base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114; UE 134 may be in communication with base station 118; UEs 138 and 140 may be in communication with base station 116 via one or more of the RRHs 144 and 148; and UE 136 may be in communication with mobile base station 120. Here, each base station 110, 112, 114, 116, 118, and 120 may be configured to provide an access point to a core network (not shown) for all the UEs in the respective cells. In another example, a mobile network node (e.g., UAV 120) may be configured to function as a UE. For example, the UAV 120 may operate within cell 102 by communicating with base station 110.

In some examples, access to the air interface may be scheduled, wherein a scheduling entity (e.g., a base station 112) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs (e.g., UE 126), which may be scheduled entities, may utilize resources allocated by the scheduling entity 112.

Base stations are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer (P2P) fashion and/or in relay configuration.

In a further aspect of the RAN 100, sidelink signals may be used between UEs without necessarily relying on scheduling or control information from a base station. For example, two or more UEs (e.g., UEs 138 and 140) may communicate with each other using peer to peer (P2P) or sidelink signals 137 without relaying that communication through a base station (e.g., base station 144). In some examples, the sidelink signals 137 include sidelink traffic and sidelink control. In some examples, the UEs 138 and 140 may each function as a scheduling entity or an initiating (e.g., transmitting) sidelink device and/or a scheduled entity or a receiving sidelink device. For example, the UEs 138 and 140 may function as scheduling entities or scheduled entities in a P2P network, a device-to-device (D2D), vehicle-to-vehicle (V2V) network, a vehicle-to-everything (V2X), a mesh network, or other suitable network.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In some examples, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or data (e.g., user data traffic or other type of traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, a UE (e.g., UE 138) may be in the coverage area of more than one cell (e.g., cells 142 and 146). In this example, each RRH 144 and 148 serving one of the cells 142 and 146 may function as a transmission and reception point (TRP) in a coordinated multi-point (COMP) network configuration in which downlink and/or uplink signals may be transmitted between the UE 138 and each of the TRPs 144 and 148. For example, downlink data may be simultaneously transmitted to the UE 138 from each of the TRPs 144 and 148 to reduce interference, increase the data rate, and/or increase the received power. As another example, downlink signals may be transmitted from one TRP (e.g., TRP 144) and uplink signals may be received at another TRP (e.g., TRP 148). In some examples, the TRPs 144 and 148 may be configured using a centralized RAN architecture in which base station 116 operates to coordinate transmissions and receptions between the UE 138 and TRPs 144 and 148.

In addition, beamformed signals may be utilized between the UE 138 and each of the TRPs 144 and 148 communicating, for example, over a mmWave carrier. To facilitate transmission of uplink signals from the UE to one or both of the TRPs using uplink beams, the base station 116 may coordinate an uplink beam management scheme in which the UE 138 may transmit uplink reference signals, such as sounding reference signals (SRSs) to each of the TRPs 144 and 148. Based on the SRS measurements, the base station 116 may select one or more uplink beams for the UE 138 to transmit uplink signals to one or more of the TRPs 144 and 148. The UE 138 may transmit the SRSs in accordance with SRS resources configured by the base station 116. An SRS resource defines the time-frequency resource location and other parameters associated with transmission of the SRS.

To simplify the configuration of SRS resources across multiple TRPs 144 and 148, in various aspects of the disclosure, the base station 116 may include an SRS manager 150 for configuring an SRS resource set including SRS resources associated with each of the TRPs 144 and 148. The base station 116 may then transmit an SRS configuration of the SRS resource set to the UE 138 via, for example, TRP 144. In addition, the UE 138 may further include an SRS manager 152 configured to use the SRS configuration to generate and transmit a plurality of SRSs to the multiple TRPs 144 and 148. For example, each of the TRPs 144 and 148 may receive at least one of the SRSs transmitted by the UE 138 in accordance with the SRS configuration.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
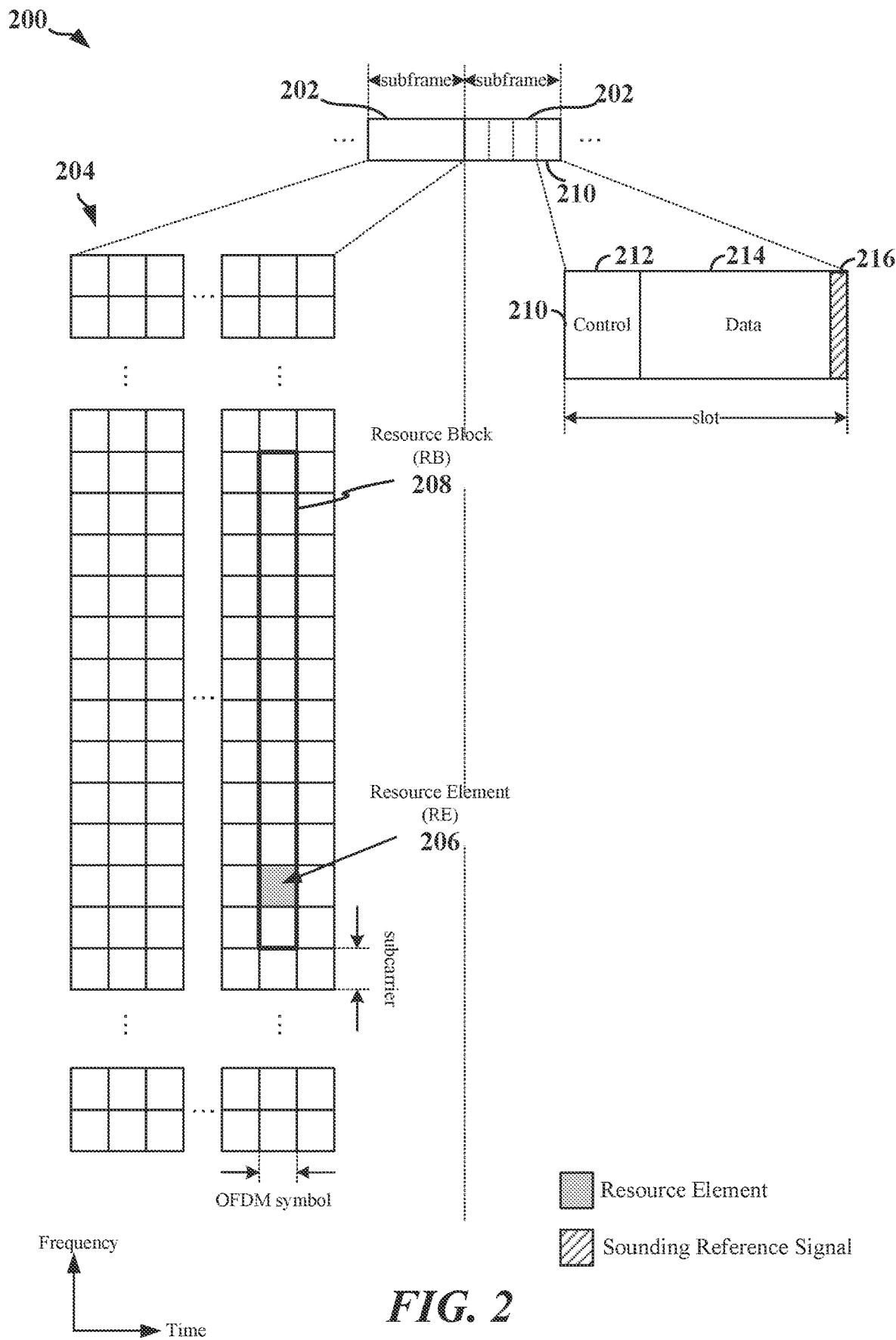
FIG. 2 is a diagram illustrating an example of a frame structure for use in a radio access network according to some aspects.

Referring now to FIG. 2, an expanded view 200 of an exemplary DL subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB), which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

Scheduling of the resources (e.g., REs 206/RBs 208) to transmit control and/or traffic information may be performed in a dynamic manner or a semi-persistent manner. For example, the scheduling entity (e.g., base station) may dynamically allocate a set of REs 206/RBs 208 for the transmission of downlink control and/or data to the UE or for the transmission of uplink control and/or data from the UE. The base station may further semi-persistently allocate a set of REs 206/RBs 208 for periodic downlink or uplink transmissions. Generally, semi-persistent scheduling (SPS) may be used for periodic communications based on defined settings. For example, SPS may be suitable for applications with small, predictable, and/or periodic payloads, such as voice over Internet protocol (VOIP) applications. On the uplink, an SPS resource may be referred to as a configured grant (CG). With CGs, scheduling information corresponding to the uplink CG may be signaled just once to the UE. Subsequently, without needing to receive additional scheduling information, the UE may periodically utilize the resources allocated in the uplink CG. The periodicity with which the UE may transmit user data traffic via the semi-persistently scheduled resources may be established when the CG is initially configured.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. In the example shown in FIG. 2, the control region 212 may include downlink control information and the data region 214 may include downlink data channels or uplink data channels. In addition, the slot 210 further includes an uplink sounding reference signal (SRS) 216 shown transmitted at an end of the slot 210. For example, the SRS 216 may be transmitted over one or more symbols within the last six symbols of the slot 210. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

A base station (BS), such as the BS 110 in the wireless communication network 100 illustrated in FIG. 1, can send information to a user equipment (UE) (e.g., a UE 122) regarding the slot format in a downlink control region. For example, the BS 110 can send the information to the UE 122 in a downlink control channel, such as the group common (GC) physical downlink control channel (PDCCH). The GC PDCCH refers to a channel, for example a PDCCH, that carries information, such as a slot format indicator (SFI) via common downlink control information (DCI), intended for a group of UEs. The UEs may be radio resource control (RRC) configured to decode the GC PDCCH. A SFI indicates the format of a current slot and/or future slot(s). The UE can use the information in the SFI to determine (identify, derive, etc.) which symbols in a slot are for uplink or downlink, or other purposes (e.g., such as sidelink, blank, or reserved).

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 206 (e.g., within the control region 212, which may be at the end of the slot 210) to carry UL control information (UCI) including one or more UL control channels, such as a physical uplink control channel (PUCCH), to the scheduling entity. UCI may include a variety of packet types and categories. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI. The scheduled entity (e.g., UE) may further utilize one or more REs 206 (e.g., within the control region 212 and/or the data region 214) to transmit pilots, reference signals, and other information configured to enable or assist in decoding uplink data transmissions and/or in uplink beam management, such as one or more DMRSs and SRSs 216.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB and/or a sidelink CSI-RS, may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1 and 2 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 3:
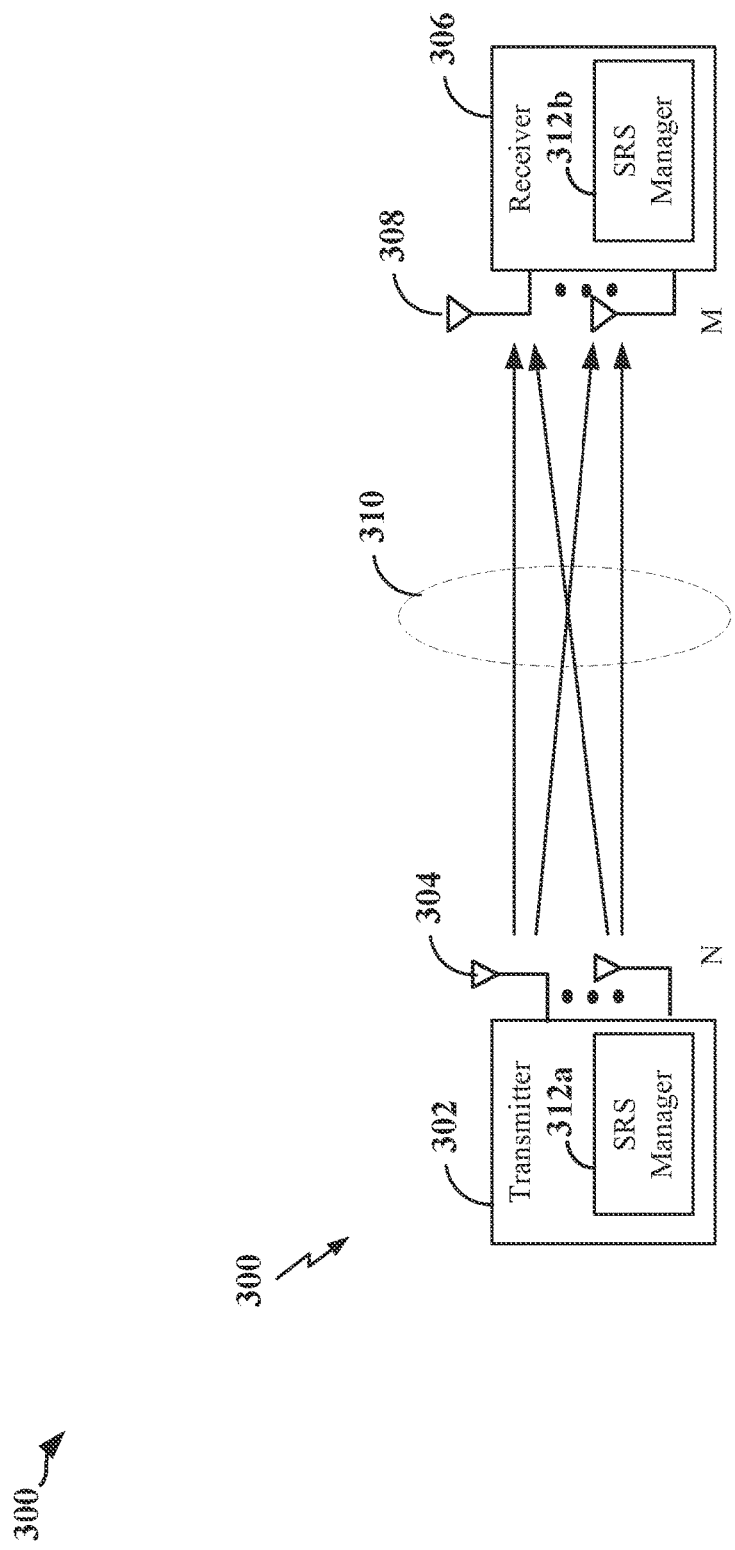
FIG. 3 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 3 illustrates an example of a wireless communication system 300 supporting beamforming and/or MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Beamforming is a signal processing technique that may be used at the transmitter 302 or receiver 306 to shape or steer an antenna beam (e.g., a transmit beam or receive beam) along a spatial path between the transmitter 302 and the receiver 306. Beamforming may be achieved by combining the signals communicated via antennas 304 or 308 (e.g., antenna elements of an antenna array) such that some of the signals experience constructive interference while others experience destructive interference. To create the desired constructive/destructive interference, the transmitter 302 or receiver 306 may apply amplitude and/or phase offsets to signals transmitted or received from the antenna elements 304 or 308 associated with the transmitter 302 or receiver 306. In some examples, the antenna elements may be mapped to antenna ports for generation of beams. Here, the term antenna port refers to a logical port (e.g., a beam) over which a signal (e.g., a data stream or layer) may be transmitted. In an example of a base station, an antenna array may include 128 antenna elements (e.g., within a 16×8 array) that may be mapped to 32 antenna ports by an 8×1 combiner.

To facilitate transmission of SRSs using uplink beams from, for example, a transmitter 302 to a receiver 306, each of the transmitter 302 and receiver 306 may include a respective SRS manager 312a and 312b configured to utilize an SRS configuration for an SRS resource set including SRS resources associated with multiple TRPs. For example, the SRS manager 312b in the receiver 306 may be configured to generate the SRS configuration and provide the SRS configuration to the transmitter 302. In addition, the SRS manager 312a in the transmitter 302 may be configured to utilize the SRS configuration to generate a plurality of SRSs for transmission towards multiple receivers 306 (one of which is shown in FIG. 3).

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub-6 GHz systems.

A base station (e.g., gNB) may generally be capable of communicating with UEs using transmit beams (e.g., downlink transmit beams) of varying beam widths. For example, a base station may be configured to utilize a wider beam when communicating with a UE that is in motion and a narrower beam when communicating with a UE that is stationary. The UE may further be configured to utilize one or more downlink receive beams to receive signals from the base station. In some examples, to select one or more downlink transmit beams and one or more downlink receive beams for communication with a UE, the base station may transmit a reference signal, such as an SSB or CSI-RS, on each of a plurality of downlink transmit beams in a beam-sweeping manner. The UE may measure the reference signal received power (RSRP) on each of the downlink transmit beams using one or more downlink receive beams on the UE and transmit a Layer 1 (L1) measurement report to the base station indicating the RSRP of one or more of the measured downlink transmit beams. The base station may then select one or more serving downlink beams (e.g., downlink transmit beams and downlink receive beams) for communication with the UE based on the L1 measurement report. The resulting selected downlink transmit beam and downlink receive beam may form a downlink beam pair link. In other examples, when the channel is reciprocal, the base station may derive the particular downlink beam(s) to communicate with the UE based on uplink measurements of one or more uplink reference signals, such as sounding reference signals (SRSs).

Similarly, uplink beams (e.g., uplink transmit beam(s) at the UE and uplink receive beam(s) at the base station) may be selected by measuring the RSRP of received uplink reference signals (e.g., SRSs) or downlink reference signals (e.g., SSBs or CSI-RSs) during an uplink or downlink beam sweep. For example, the base station may determine the uplink beams either by uplink beam management via an SRS beam sweep with measurement at the base station or by downlink beam management via an SSB/CSI-RS beam sweep with measurement at the UE. The selected uplink beam may be indicated by a selected SRS resource identifier (SRI) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

Figure 4:
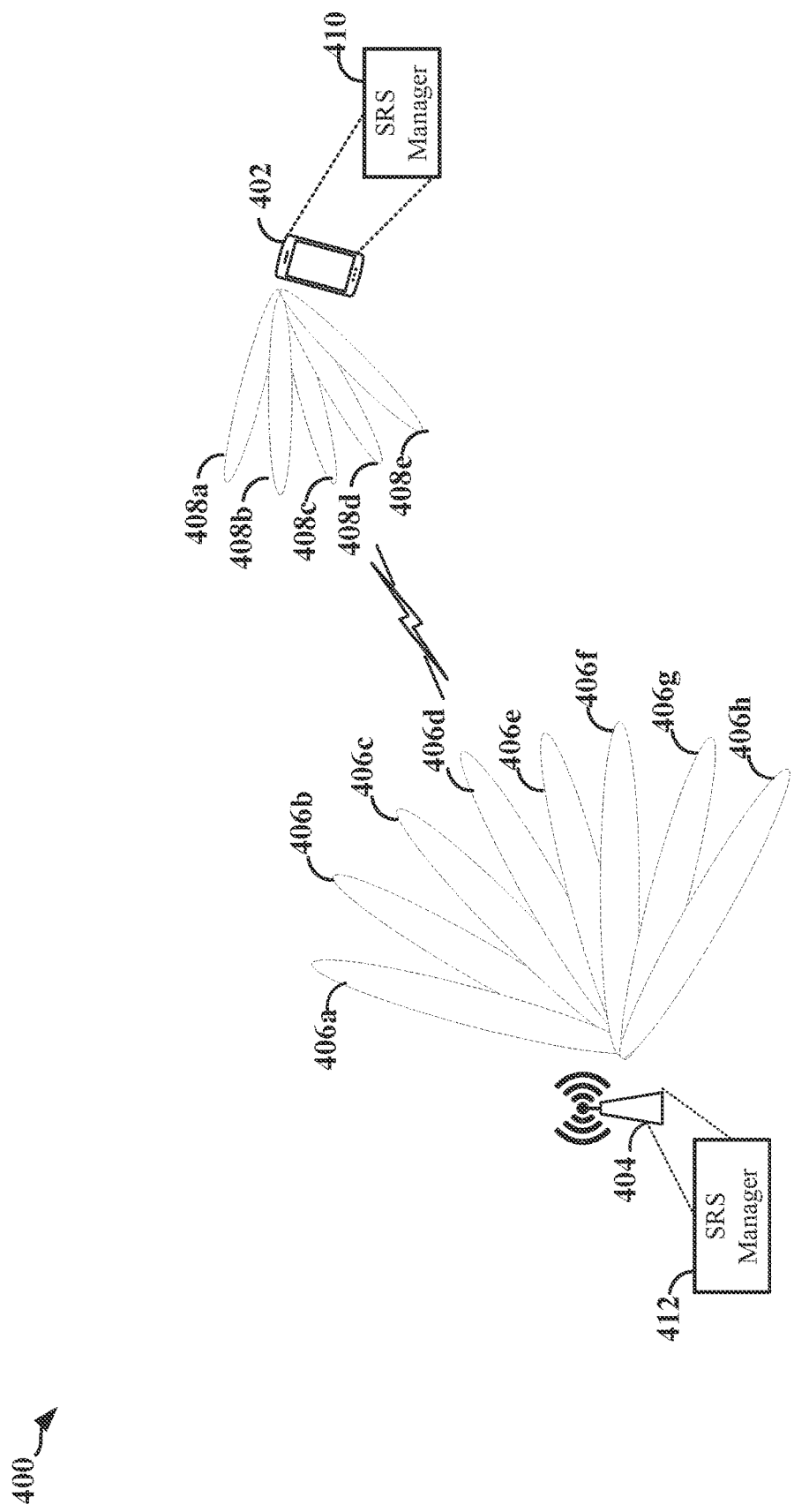
FIG. 4 is a diagram illustrating an example of communication between a base station and a UE using beamforming according to some aspects.

FIG. 4 is a diagram illustrating communication between a base station 404 and a UE 402 using beamformed signals according to some aspects. The base station 404 may be any of the base stations (e.g., gNBs) or scheduling entities illustrated in FIGS. 1 and/or 2, and the UE 402 may be any of the UEs or scheduled entities illustrated in FIGS. 1 and/or 2.

In the example shown in FIG. 4, the base station 404 is configured to generate a plurality of beams 406a-406h, each associated with a different beam direction. In addition, the UE 402 is configured to generate a plurality of beams 408a-408e, each associated with a different beam direction. The base station 404 and UE 402 may select one or more beams 406a-406h on the base station 404 and one or more beams 408a-408e on the UE 402 for communication of uplink and downlink signals therebetween using a downlink beam management scheme and/or an uplink beam management scheme.

In an example of a downlink beam management scheme for selection of downlink beams, the base station 404 may be configured to sweep or transmit on each of a plurality of downlink transmit beams 406a-406h during one or more synchronization slots. For example, the base station 404 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). It should be noted that while some beams are illustrated as adjacent to one another, such an arrangement may be different in different aspects. For example, downlink transmit beams 406a-406h transmitted during a same symbol may not be adjacent to one another. In some examples, the base station 404 may transmit more or less beams distributed in all directions (e.g., 360 degrees).

In addition, the UE 402 is configured to receive the downlink beam reference signals on a plurality of downlink receive beams 408a-408e. In some examples, the UE 402 searches for and identifies each of the downlink transmit beams 406a-406h based on the beam reference signals. The UE 402 then performs beam measurements (e.g., RSRP, SINR, RSRQ, etc.) on the beam reference signals on each of the downlink receive beams 408a-408e to determine the respective beam quality of each of the downlink transmit beams 406a-406h as measured on each of the downlink receive beams 408a-408e.

The UE 402 can generate and transmit an L1 measurement report, including the respective beam index (beam identifier (ID)) and beam measurement of one or more of the downlink transmit beam 406a-406h on one or more of the downlink receive beams 408a-408e to the base station 404. The base station 404 may then select one or more downlink transmit beams on which to transmit unicast downlink control information and/or user data traffic to the UE 402. In some examples, the selected downlink transmit beam(s) have the highest gain from the beam measurement report. In some examples, the UE 402 can further identify the downlink transmit beams selected by the base station from the beam measurements. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The base station 404 or the UE 402 may further select a corresponding downlink receive beam on the UE 402 for each selected serving downlink transmit beam to form a respective downlink beam pair link (BPL) for each selected serving downlink transmit beam. For example, the UE 402 can utilize the beam measurements to select the corresponding downlink receive beam for each serving downlink transmit beam. In some examples, the selected downlink receive beam to pair with a particular downlink transmit beam may have the highest gain for that particular downlink transmit beam.

In one example, a single downlink transmit beam (e.g., beam 406d) on the base station 404 and a single downlink receive beam (e.g., beam 408c) on the UE may form a single downlink BPL used for communication between the base station 404 and the UE 402. In another example, multiple downlink transmit beams (e.g., beams 406c, 406d, and 406e) on the base station 404 and a single downlink receive beam (e.g., beam 408c) on the UE 402 may form respective downlink BPLs used for communication between the base station 404 and the UE 402. In another example, multiple downlink transmit beams (e.g., beams 406c, 406d, and 406e) on the base station 404 and multiple downlink receive beams (e.g., beams 408c and 408d) on the UE 402 may form multiple downlink BPLs used for communication between the base station 404 and the UE 402. In this example, a first downlink BPL may include downlink transmit beam 406c and downlink receive beam 408c, a second downlink BPL may include downlink transmit beam 408d and downlink receive beam 408c, and a third downlink BPL may include downlink transmit beam 408e and downlink receive beam 408d.

When the channel is reciprocal, the above-described downlink beam management scheme may also be used to select one or more uplink BPLs for uplink communication from the UE 402 to the base station 404. For example, the downlink BPL formed of beams 406d and 408e may also serve as an uplink BPL. Here, beam 408c is utilized as an uplink transmit beam, while beam 406d is utilized as an uplink receive beam.

In an example of an uplink beam management scheme, the UE 402 may be configured to sweep or transmit on each of a plurality of uplink transmit beams 408a-408e. For example, the UE 402 may transmit an SRS on each beam in the different beam directions. In addition, the base station 404 may be configured to receive the uplink beam reference signals on a plurality of uplink receive beams 406a-406h. In some examples, the base station 404 searches for and identifies each of the uplink transmit beams 408a-408e based on the beam reference signals. The base station 404 then performs beam measurements (e.g., RSRP, SINR, RSRQ, etc.) on the beam reference signals on each of the uplink receive beams 406a-406h to determine the respective beam quality of each of the uplink transmit beams 408a-408e as measured on each of the uplink receive beams 406a-406h.

The base station 404 may then select one or more uplink transmit beams on which the UE 402 will transmit unicast downlink control information and/or user data traffic to the base station 404. In some examples, the selected uplink transmit beam(s) have the highest gain. The base station 404 may further select a corresponding uplink receive beam on the base station 404 for each selected serving uplink transmit beam to form a respective uplink beam pair link (BPL) for each selected serving uplink transmit beam. For example, the base station 404 can utilize the uplink beam measurements to select the corresponding uplink receive beam for each serving uplink transmit beam. In some examples, the selected uplink receive beam to pair with a particular uplink transmit beam may have the highest gain for that particular uplink transmit beam.

The base station 404 may then notify the UE 402 of the selected uplink transmit beams. For example, the base station 404 may provide the SRS resource identifiers (SRIs) identifying the SRSs transmitted on the selected uplink transmit beams. In some examples, the base station 404 may apply each selected uplink transmit beam (and corresponding uplink receive beam) to an uplink signal (e.g., PUCCH, PUSCH, etc.) and transmit the respective SRIs associated with the selected uplink transmit beams applied to each uplink signal to the UE 402. When the channel is reciprocal, the above-described uplink beam management scheme may also be used to select one or more downlink BPLs for downlink communication from the base station 404 to the UE 402. For example, the uplink BPLs may also be utilized as downlink BPLs.

To facilitate transmission of SRSs using uplink beams from the UE 402 to the base station 404, each of the UE 402 and base station 406 may include a respective SRS manager 410 and 412, respectively, configured to utilize an SRS configuration for an SRS resource set including SRS resources associated with multiple TRPs (e.g., the base station 404 and at least one other base station or TRP). For example, the SRS manager 412 may be configured to generate the SRS configuration and provide the SRS configuration to the UE 402. In addition, the SRS manager 410 may be configured to utilize the SRS configuration to generate a plurality of SRSs for transmission towards the base station 404 and at least one other base station or TRP.

Figure 5:
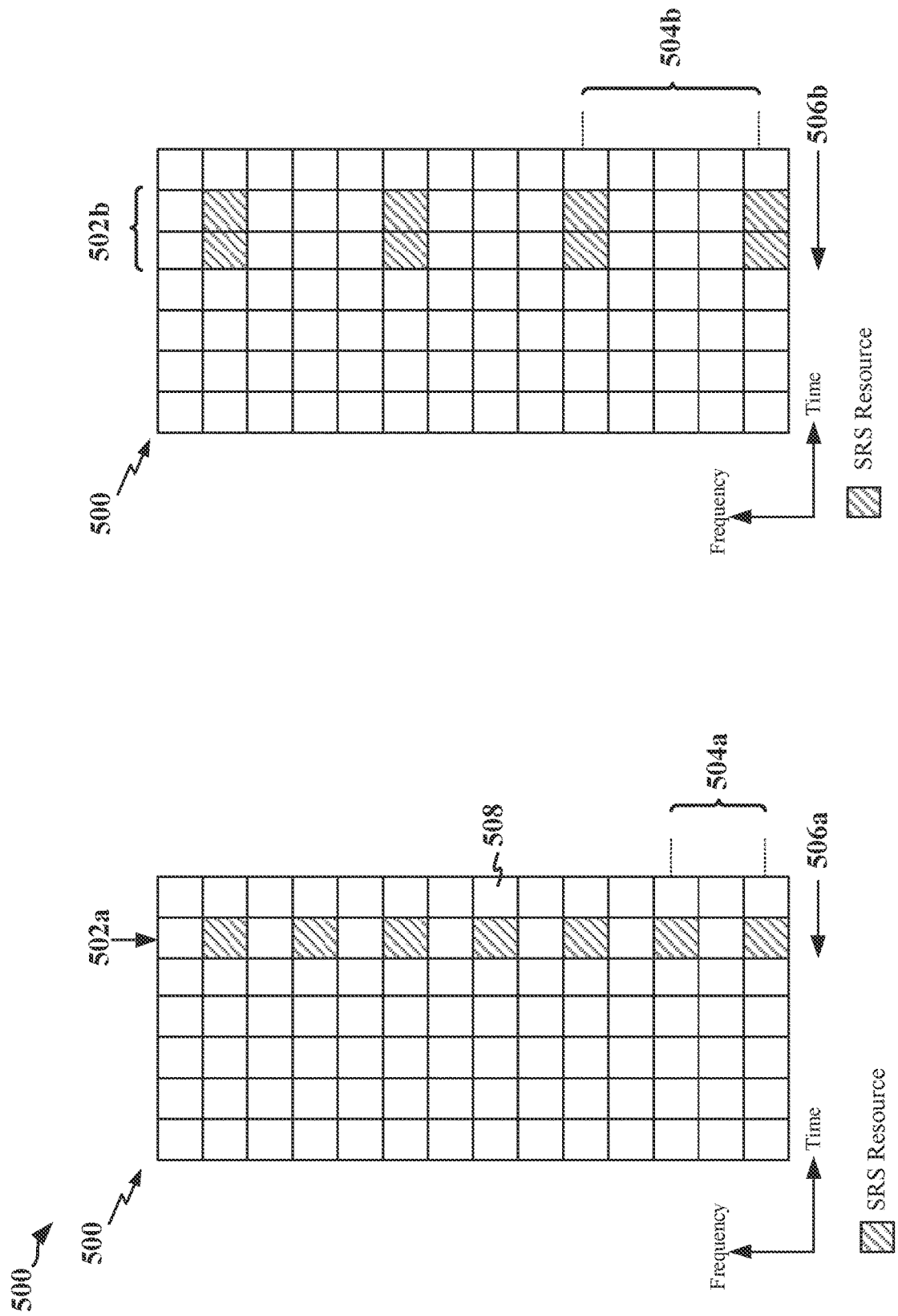
FIGS. 5A and 5B are diagrams illustrating examples of sounding reference signal (SRS) resources according to some aspects.

FIGS. 5A and 5B are diagrams illustrating examples of sounding reference signal (SRS) resources 502a and 502b according to some aspects. The SRS resources 502a and 502b are illustrated as being located within a portion of a resource grid 500 including a plurality of REs 508. In the time domain, an SRS resource can include a number of consecutive OFDM symbols $N_{symb}$ selected from the set consisting of $\{1, 2, 4\}$. Thus, an SRS resource can occupy 1, 2, or 4 OFDM symbols. In the example shown in FIG. 5A, the SRS resource 502a includes one OFDM symbol, while in the example shown in FIG. 5B, the SRS resource 502b includes two OFDM symbols. In addition, an SRS resource may be located within the last six symbols of a slot. Thus, the starting symbol of an SRS resource may be designated as a number of symbols offset from the last symbol of the slot. For example, the starting symbol $I_{offset}$ may be selected from the set consisting of $\{0, 1, 2, 3, 4, 5\}$. In the example shown in FIG. 5A, the starting symbol 506a may be indicated as $I_{offset}=1$, while in the example shown in FIG. 5B, the starting symbol 506b may be indicates as $I_{offset}=2$.

In the frequency domain, each SRS resource 502a and 502b may occupy a number of RBs $m_{SRS}$. In some examples, the number of RBs may be between $1 \leq m_{SRS} \leq 272$. In addition, each SRS resource 502a and 502b may have a transmission comb structure $k_{TC}$, such that the SRS is transmitted every Nth subcarrier, where N=2 or 4. Thus, the transmission comb structure $k_{TC}$ may be selected from the set consisting of {2, 4}. In the example shown in FIG. 5A, the SRS resource 502a has a transmission comb structure 504a of two, while in the example shown in FIG. 5B, the SRS resource 502b has a transmission comb structure 504b of four. In some examples, an SRS resource (e.g., SRS resource 502b) occupying more than one symbol may be used to transmit a single SRS or one or more repetitions of the SRS. In addition, each SRS resource 502a and 502b may include up to four antenna ports that may be interleaved, for example, in the frequency domain.

Figure 6:
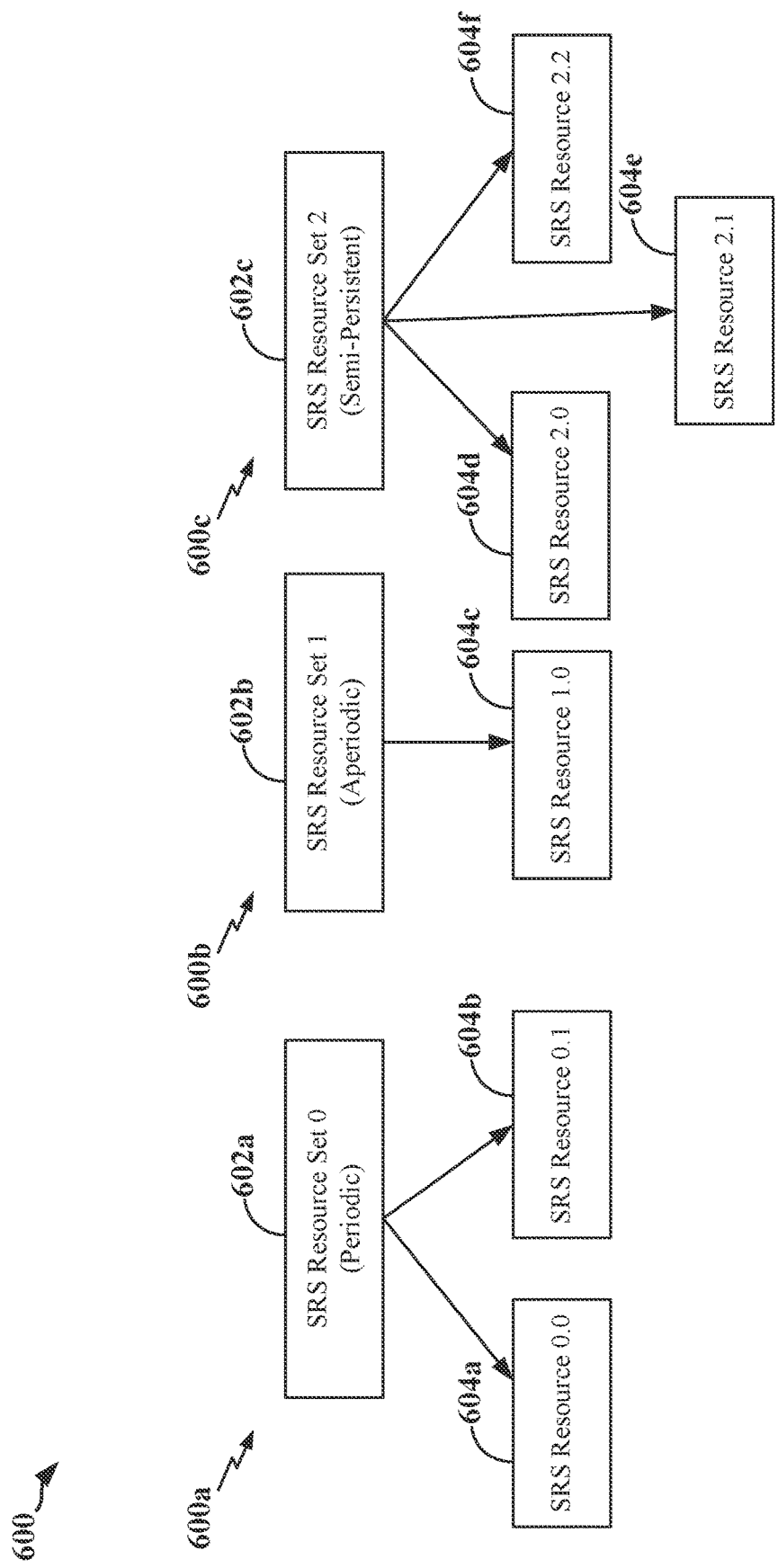
FIG. 6 is a diagram illustrating exemplary SRS resource sets, each including SRS resources according to some aspects.

FIG. 6 is a diagram illustrating exemplary SRS configurations 600a-600c for SRS resource sets 602a-602c, each including SRS resources 604a-604f according to some aspects. An SRS resource set may include one or more SRS resources. For example, SRS resource set 602a (SRS Resource Set 0) includes SRS resources 604a and 604b (SRS Resource 0.0 and SRS Resource 0.1), SRS resource set 602b (SRS Resource Set 1) includes SRS resource 604c (SRS Resource 1.0), and SRS resource set 602c (SRS Resource Set 2) includes SRS resource sets 604d, 604e, and 604f (SRS Resource 2.0, SRS Resource 2.1, and SRS Resource 2.2).

As indicated in FIG. 6, multiple SRS resource sets 602a-602c may be configured for a UE. In addition, each SRS resource set 602a-602c may be configured to be periodic, aperiodic, or semi-persistent, such that each of the SRS resources within the corresponding SRS resource set are periodic, aperiodic, or semi-persistent, respectively. For example, the SRS resources 604a and 604b within SRS resource set 602a may be periodic SRS resources, the SRS resource 604c within SRS resource set 602b may be aperiodic SRS resources, and the SRS resources 604d-604f within SRS resource set 602c may be semi-persistent SRS resources.

Each SRS resource 604a-604f includes a set of SRS resource parameters configuring the SRS resource. For example, the SRS resource parameters may include a set of port(s) (e.g., uplink beam), number of consecutive symbols ($N_{symb}$), time domain allocation ($I_{offset}$), repetition, transmission comb structure ($k_{TC}$), bandwidth ($m_{SRS}$), and other suitable parameters. Each SRS may further be quasi co-located (QCL'ed) with another reference signal, such as an SSB, CSI-RS, or another SRS. Thus, based on the QCL association (e.g., with an SSB beam, CSI-RS beam, or SRS beam), the SRS resource may be transmitted with the same spatial domain filter utilized for reception/transmission of the indicated reference signal (e.g., SSB beam, CSI-RS beam, or SRS beam).

The respective sets of SRS resource parameters for each of the SRS resources in a particular SRS resource set collectively form the SRS resource set parameters for the SRS resource set. In addition, the SRS resource set itself may further include additional SRS resource set parameters. For example, the SRS resource set parameters for the aperiodic SRS resource set 602b may further include an aperiodic trigger state (e.g., codepoint) for the aperiodic SRS resource set 602b (e.g., up to three trigger states may be possible, each mapping to an aperiodic SRS resource set), a slot offset between the slot including the DCI triggering the aperiodic SRS resource and transmission of the SRS (e.g., SRS is transmitted k slot(s) after the slot carrying the DCI containing the trigger state), and a CSI-RS resource identifier (CRI) associated with the aperiodic SRS resource set 602b for precoder estimation of the aperiodic SRSs. As another example, the SRS configuration for a periodic SRS resource set 602a or semi-persistent SRS resource set 602c may indicate the periodicity of the SRS resources (e.g., the periodicity of transmission of SRSs). The respective SRS resource set parameters then collectively form the SRS configuration 600a-600c of the corresponding SRS resource set 602a-602c.

Certain aspects of the disclosure provide enhanced signaling that can be used for partial frequency sounding when multiple UEs are multiplexed using the same frequency resources. The enhanced signaling relates to group common downlink control information (GC-DCI), which provides a block of control information used for signaling multiple UEs. UEs can be configured to use GC-DCI for SRS transmissions.

SRS transmissions by the UE can be used by a base station for CSI acquisition and beam management. Certain 5G NR network support SRS resources that span 1, 2 or 4 adjacent symbols. Each SRS resource set contains a sets of SRS resources transmitted by one UE. Transmission of the SRS resource may be aperiodic, semi-persistent or periodic. Aperiodic SRS transmissions may be triggered or otherwise signaled using DCI. A UE may be configured or provisioned with multiple resources, which may be grouped in a SRS resource set depending on use case, where use case may be antenna switching, codebook-based, non-codebook based or beam management.

DCI 2_3 can be used for power control and may include a group of TPC commands for SRS transmissions by one or more UEs. Along with a TPC command, an SRS request may also be transmitted. FIG. 7 illustrates an example of SRS requests 700 that can be transmitted by a base station to configure the use GC-DCI for SRS transmissions in 5G NR network. DCI 2_3 defines a structure which contains multiple blocks, each block relating to one or more component carriers (CCs). In networks that use carrier aggregation (CA), a TPC may be provided for each CC. CA is used in certain networks to increase the data rate for one or more UEs by defining a set that includes multiple contiguous or non-contiguous CCs. In one example, 5G NR can support up to 16 contiguous and non-contiguous CCs and can aggregate new 5G bands up to approximately 1 GHz of spectrum. Certain elements of an SRS request (0, 2 bits) may determine the CC set used for CA.

Certain aspects of this disclosure provide signaling enhancements related to SRS capacity, SRS coverage, and/or partial sounding for UEs that are multiplexed across a shared frequency band. SRS capacity can determine the number of UEs that can be multiplexed when each UE uses a portion of the SRS resources, thereby operating using partial sounding.

Figure 8:
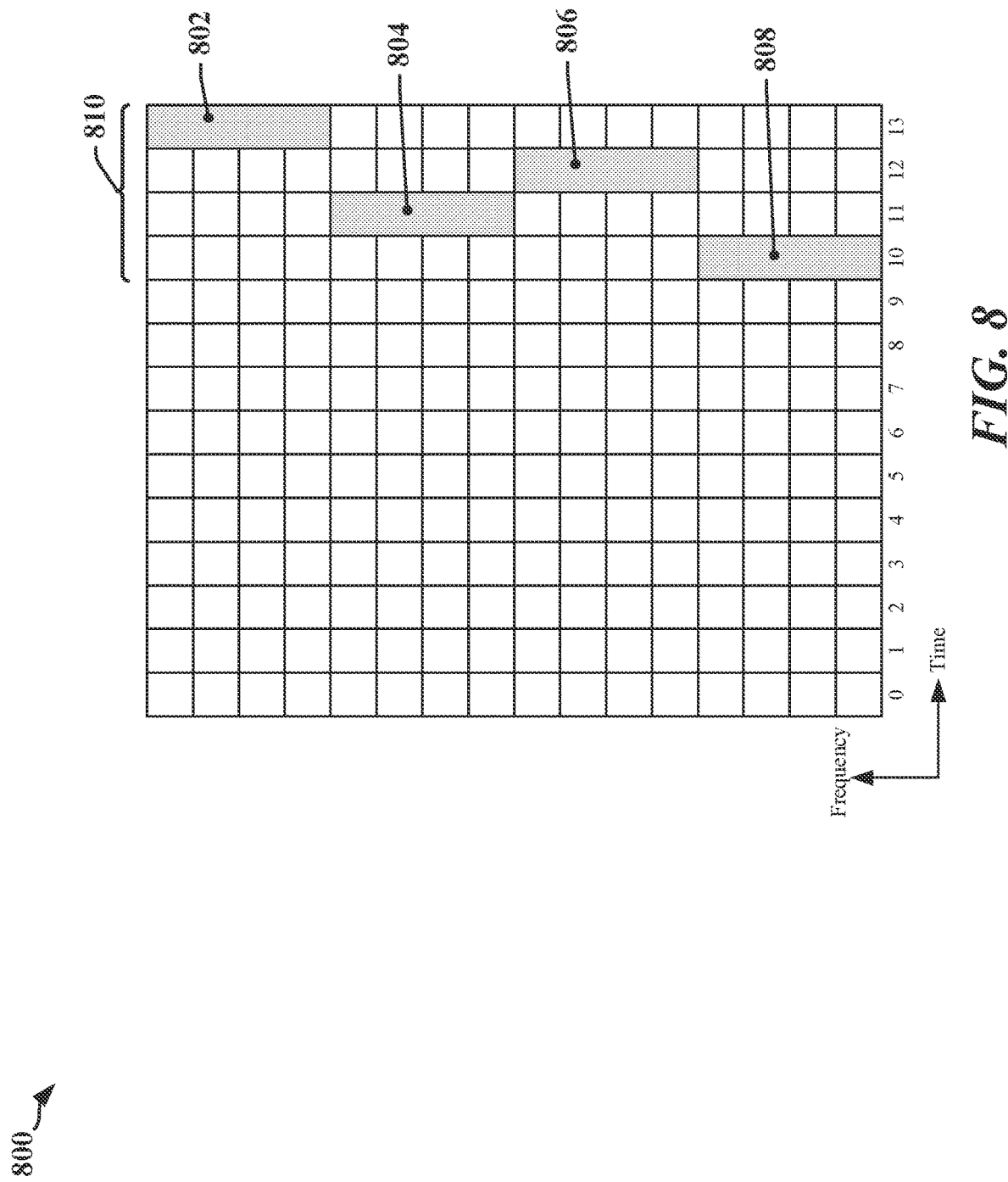
FIG. 8 illustrates resource allocation for SRS in a resource grid.

FIG. 8 illustrates a resource grid 800 for a conventional resource allocation for SRS. The illustrated resource allocation employs hopping in time such that SRS resources are provided in four groups 802, 804, 806, 808 separated by time and frequency. The resources in the four groups 802, 804, 806, 808 are allocated to a single UE that can transmit SRS in each CC and in a period 810 at the end of the resource grid 800. The SRS hopping pattern is designed to sound the full bandwidth and is RRC configured for each UE.

Figure 9:
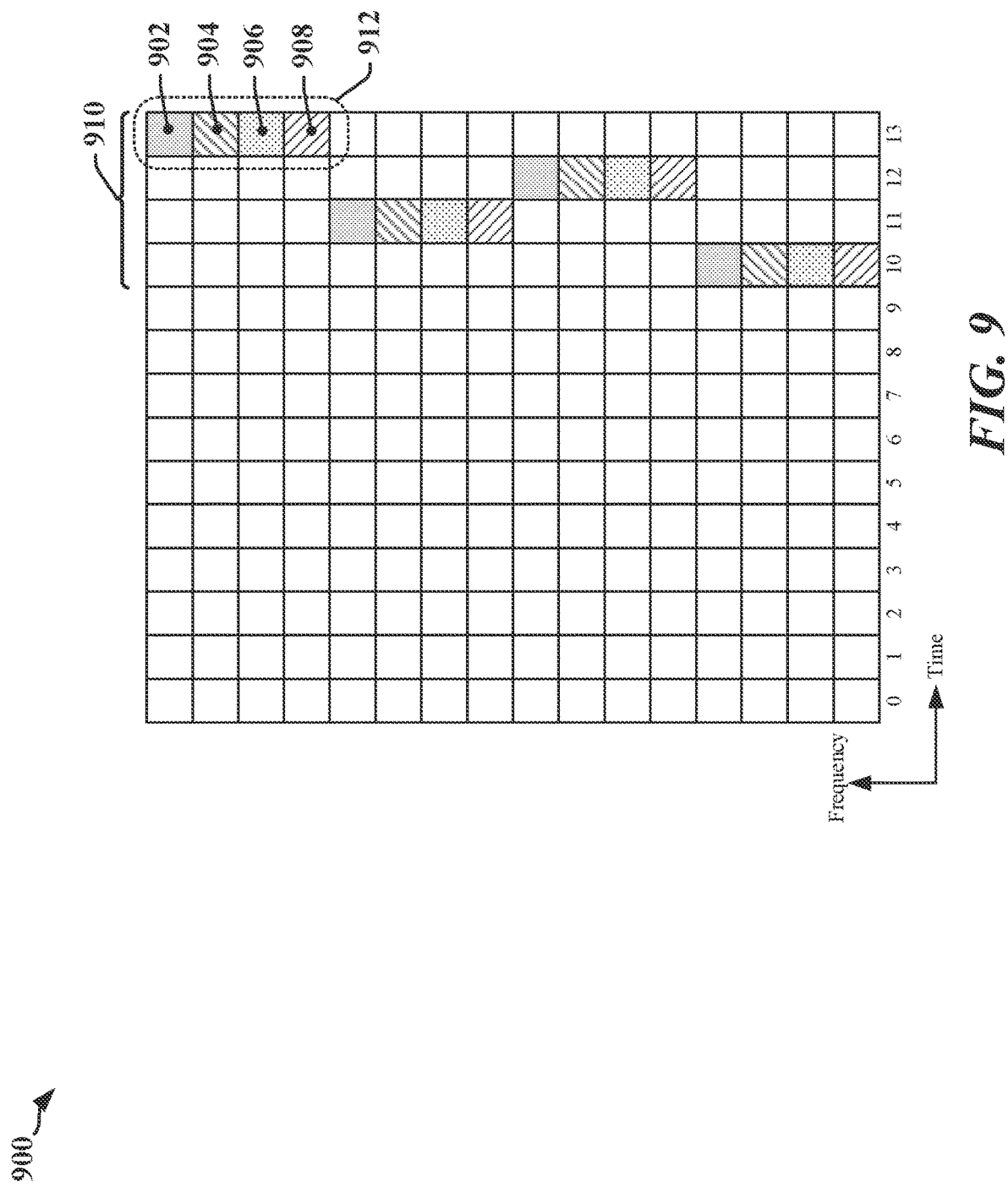
FIG. 9 illustrates a first example of a resource grid for partial frequency sounding provided in accordance with certain aspects of this disclosure.

FIG. 9 illustrates a first example of a resource grid 900 provided in accordance with certain aspects of this disclosure to support partial frequency sounding when multiple UEs are multiplexed using the same frequency resources. In this example, SRS resources are allocated among four UEs. The SRS resources are configured with hopping in time such that four RB groups are provided as SRS resources in different time intervals within a period 910 at the end of the resource grid 900, the RB groups being separated by time and frequency. In the illustrated example, a first RB group 912 includes four RBs 902, 904, 906, 908 divided among the four UEs. Each UE is allocated four RBs for use as SRS resources, and the relative positioning of the RBs may be maintained across all four groups. In this example, a first UE may be allocated a first RB 902 that includes the highest frequency CC in a first group of resources and in each of the other groups of SRS resources.

In some implementations, the relative position of SRS resources allocated to one or more UEs may vary between groups. In some implementations, the relative position of SRS resources allocated to one or more UEs may be changed after each transmission of SRS or after a configured number of SRS transmissions. In the latter example, an index may be assigned for each UE identifying current location within one or more groups of SRS resources, and location may be varied by incrementing or decrementing the index. For example, an index or location number may cycle through the sequence {0, 1, 2, 3, 0, 1 . . . } when four resources are defined for the corresponding group of SRS resources. In some implementations, the relative position of SRS resources allocated to one or more UEs may be changed using RRC signaling.

In some implementations, each UE may be allocated of SRS resources in fewer than all of the groups. For example, sufficient SRS resources in each group may not be available to allocate a resource for each UE when five or more UEs share the RS resources.

Figure 10:
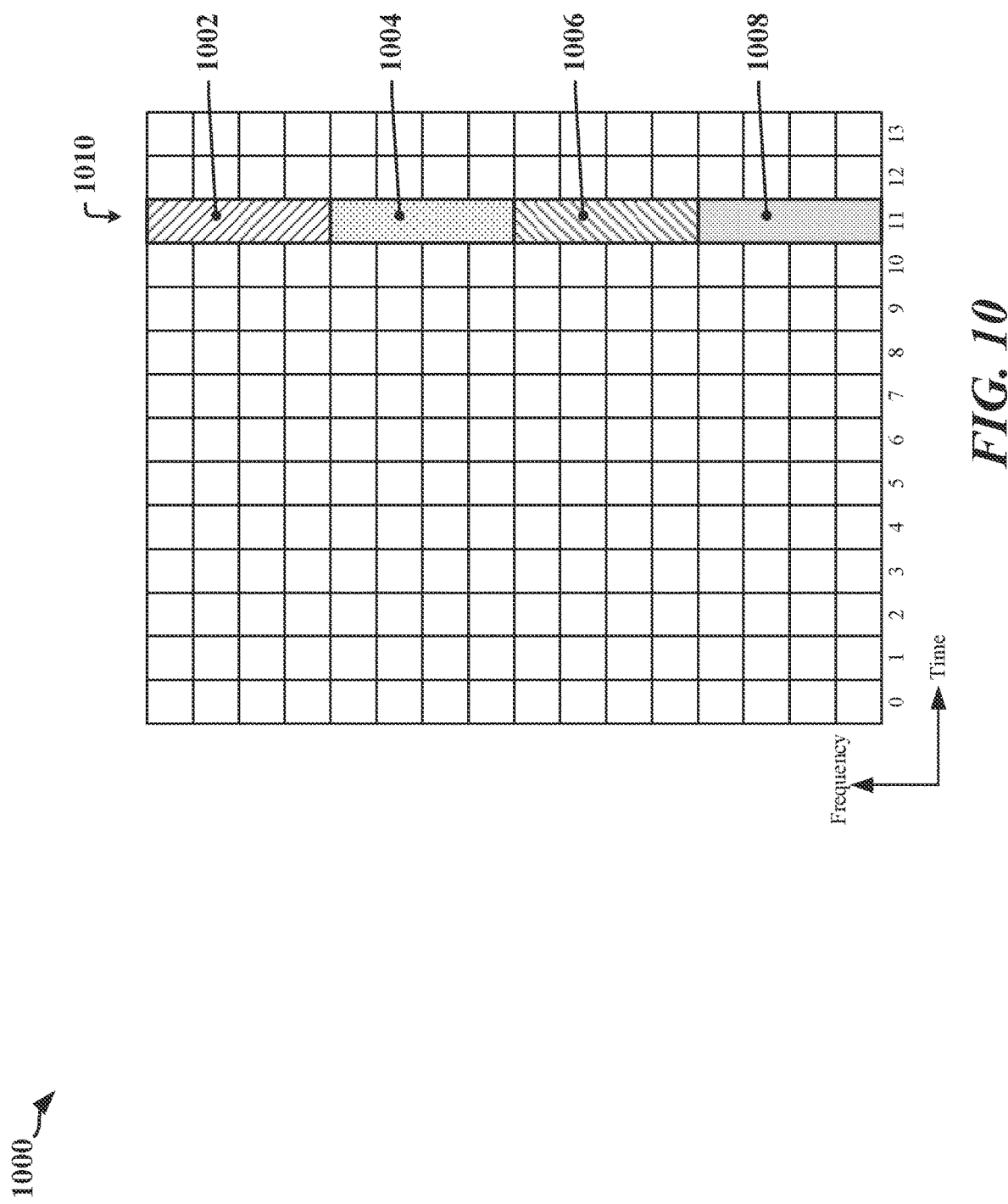
FIG. 10 illustrates a second example of a resource grid for partial frequency sounding provided in accordance with certain aspects of this disclosure.

FIG. 10 illustrates a second example of a resource grid 1000 provided in accordance with certain aspects of this disclosure to support partial frequency sounding when multiple UEs are multiplexed using the same frequency resources. In this example, SRS resources are allocated among four UEs. The SRS resources are configured without hopping in time and allocated in four groups 1002, 1004, 1006, 1008 of frequency-contiguous SRS resources. The four groups 1002, 1004, 1006, 1008 of frequency-contiguous SRS resources are provided in the same time interval 1010 near the end of the resource grid 1000. In the illustrated example, a first group 1002 includes four SRS resources allocated to a first UE, a second group 1004 includes four SRS resources allocated to a second UE, a third group 1006 includes four SRS resources allocated to a third UE and a fourth group 1008 includes four SRS resources allocated to a fourth UE.

The relative positioning of the four groups 1002, 1004, 1006, 1008 in the resource grid 1000 may be maintained between transmissions. In some implementations, the relative position of the four groups 1002, 1004, 1006, 1008 within the resource grid 1000 may be changed after each transmission of SRS or after a configured number of SRS transmissions. In some implementations, different UEs may be allocated different numbers of SRS resources.

Figure 11:
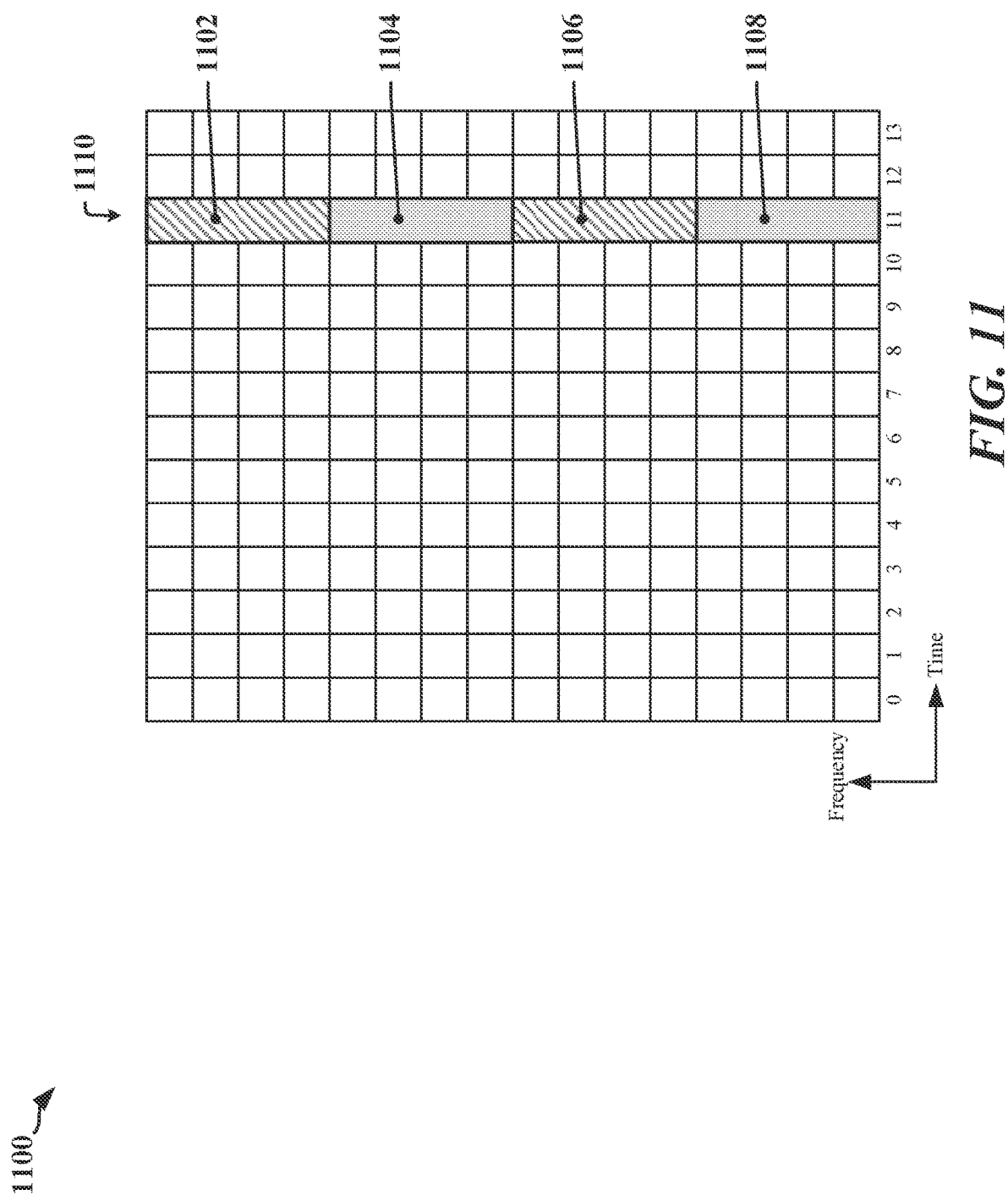
FIG. 11 illustrates a third example of a resource grid for partial frequency sounding provided in accordance with certain aspects of this disclosure.

FIG. 11 illustrates a third example of a resource grid 1100 provided in accordance with certain aspects of this disclosure to support partial frequency sounding when multiple UEs are multiplexed using the same frequency resources. In this example, SRS resources are allocated among two UEs. The SRS resources are configured without hopping in time and provided in four groups 1102, 1104, 1106, 1108. For each UE, the allocated SRS resources are not frequency-contiguous. The four groups 1102, 1104, 1106, 1108 of SRS resources are provided in the same time interval 1110 near the end of the resource grid 1100. In the illustrated example, a first group 1102 includes four SRS resources allocated to a first UE, a second group 1104 includes four SRS resources allocated to a second UE, a third group 1106 includes four SRS resources allocated to the first UE and a fourth group 1108 includes four SRS resources allocated to the second UE. Each UE is allocated 8 SRS resources.

The relative positioning of the four groups 1102, 1104, 1106, 1108 in the resource grid 1100 may be maintained between transmissions. In some implementations, the relative position of the four groups 1102, 1104, 1106, 1108 within the resource grid 1100 may be changed after each transmission of SRS or after a configured number of SRS transmissions. In some implementations, different UEs may be allocated different numbers of SRS resources.

Figure 12:
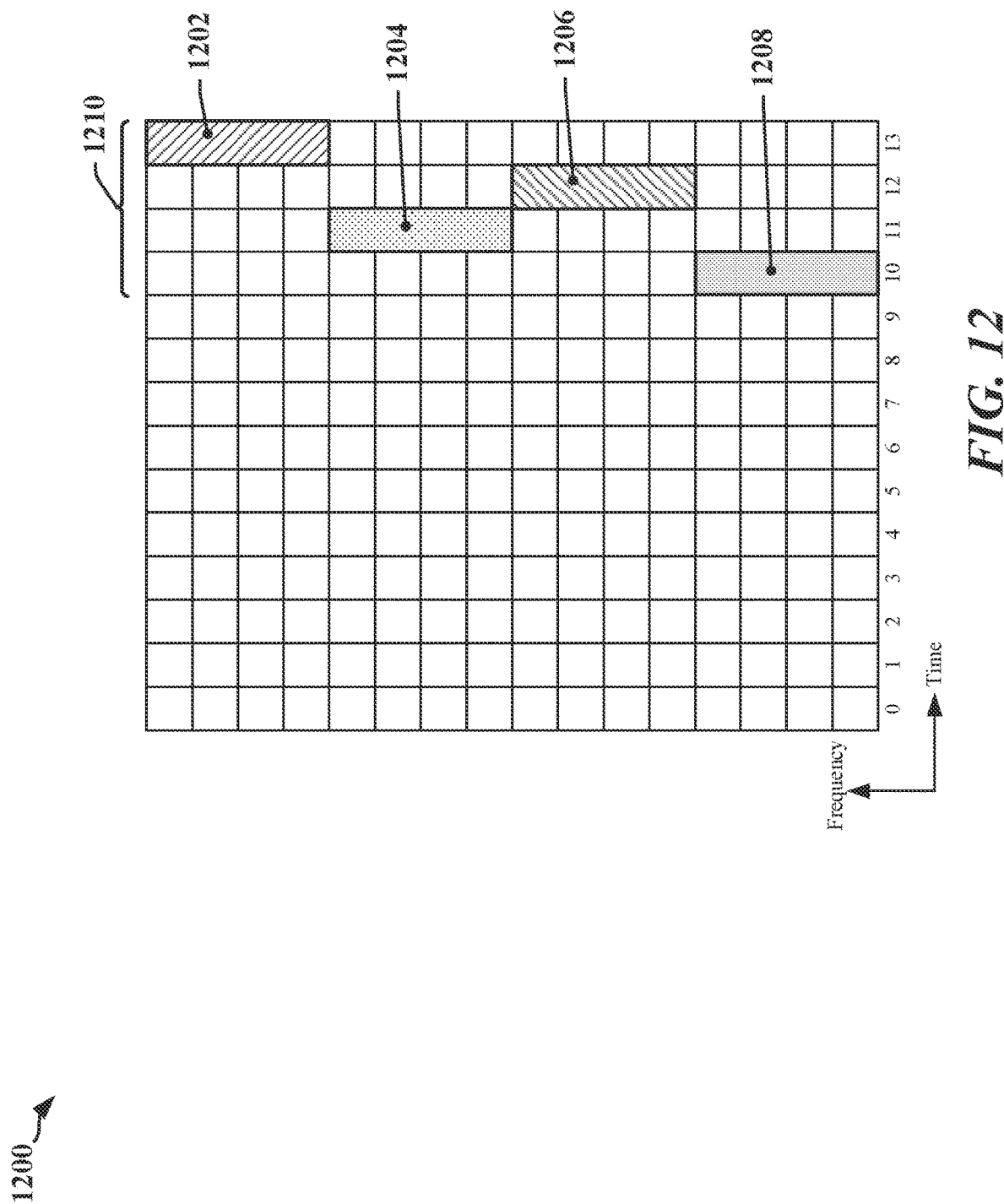
FIG. 12 illustrates a fourth example of a resource grid 1200 that may be adapted according to certain aspects of this disclosure to support partial frequency sounding when multiple UEs are multiplexed using the same frequency resources.

FIG. 12 illustrates a fourth example of a resource grid 1200 provided in accordance with certain aspects of this disclosure to support partial frequency sounding when multiple UEs are multiplexed using the same frequency resources. In this example, SRS resources are allocated among four UEs. The SRS resources are configured with hopping in time such that four groups 1202, 1204, 1206, 1208 of SRS resources are provided in different time intervals within a period 1210 at the end of the resource grid 1200, the groups being separated by time and frequency. In the illustrated example, a first group 1202 includes four SRS resources allocated to a first UE, a second group 1204 includes four SRS resources allocated to a second UE, a third group 1206 includes four SRS resources allocated to a third UE and a fourth group 1208 includes four SRS resources allocated to a fourth UE.

The relative positioning of the four groups 1202, 1204, 1206, 1208 in the resource grid 1200 may be maintained between transmissions. In some implementations, the relative position of the four groups 1202, 1204, 1206, 1208 within the resource grid 1200 may be changed after each transmission of SRS or after a configured number of SRS transmissions. In some implementations, different UEs may be allocated different numbers of SRS resources.

Certain aspects of the disclosure provide SRS resource information to UEs that are multiplexed using the same frequency resources. The SRS resource information may include information identifying the frequencies to be used by the UEs for transmitting SRS. A single UE can sound only on the sub-band of the configured SRS frequency resources when partial frequency sounding is employed. The UE can hop between a smaller set of frequency resources when partial frequency sounding is configured (see FIGS. 9 and 12), or can sound a single contiguous sub-band without hopping (see FIG. 10) or non-contiguous sub-bands (see FIG. 11).

Signaling provided in accordance with certain aspects of this disclosure can inform the UE which frequency resources are to be used for partial frequency sounding, including information regarding hopping and sub-bands. In one aspect, a multiple block DCI format is defined to enable the base station to configure one or more UEs for partial frequency sounding. In another aspect, an enhanced GC-DCI format is defined to enable the base station to configure one or more UEs for partial frequency sounding.

A multiple block DCI format provided in accordance with an aspect of the disclosure provides a block of information for each UE. The multiple block DCI format may also provide a bitmap that can be used by each UE to identify SRS resources assigned to the UE for partial frequency sounding.

The base station may use RRC signaling to configure UEs and to configure resource blocks for SRS. Referring again to FIG. 9, for example, the base station may define the first RB group 912 that includes four RBs 902, 904, 906, 908 that are to be allocated for the use of different UEs.

In one aspect, DCI may be formatted with multiple blocks, and each block may correspond to one or more UEs. Each block may include a bitmap that can be used to select sub frequency resources to be sounded. The bitmap may directly identify the sub frequency resources. In the hopping example illustrated in FIG. 9, the first RB group 912 (also referred to as the first hop) includes 4 sub-hops which can be allocated among 4 UEs. In this example, each sub-hop includes a single RB 902, 904, 906, 908, although one or more sub-hops may include more than one of the RBs 902, 904, 906, 908. A first UE may be configured with a bitmap with the value '1000' indicating that the first UE can use the first sub-hop for sounding and that the remaining 3 sub-hops are unavailable or unused for sounding by the first UE.

In the non-hopping example illustrated in FIG. 10, the RBs allocated for SRS by the base station may be divided into four RB groups 1002, 1004, 1006, 1008, and each of the RB groups 1002, 1004, 1006, 1008 can be allocated for the use of different UEs. Each of the RB groups 1002, 1004, 1006, 1008 includes 4 RBs, although one or more of the RB groups 1002, 1004, 1006, 1008 may include more than four RBs. A first UE may be configured with a bitmap with the value '1000' indicating that the first UE can use the sub-band that includes the first RB group 1002 for sounding and that the remaining 3 RB groups 1004, 1006, 1008 are unavailable or unused for sounding by the first UE.

In some implementations, a bitmap provided by the DCI is valid for all hops or transmissions. In some implementations, cycling within the hops can be indicated by RRC signaling. In one example, the bitmap may be cycled in a sequence such as {1000→0100→0010→0001→1000 . . . }.

In some instances, the bitmap may indicate that more than one sub-resource (sub-hop or sub-band) may be sounded. For example, a bitmap with the value '1001' indicates that the first UE can use the first and last sub-hops or the first and last sub-bands for sounding. The bitmap can support non-contiguous resource sounding including when, for example, the bit map has the value '1010' or '0101'.

In one aspect, the DCI may be formatted to include multiple blocks, where each block corresponds to one or more UEs and includes an index that indicates an entry in an RRC-configured table. The entry in the table may identify which sub-frequency resource (sub-hop or sub-band) is assigned to the corresponding UE to be sounded. In the 4-UE, 4 sub-frequency resources examples illustrated in FIGS. 9, 10 and 12, a 2-bit index is sufficient to indicate one of the four possible entries of pre-configured table. The use of an index can provide benefits over bitmaps when the sub-frequency resources are unequally split, when larger numbers of UEs are to be configured, and when it is desirable to increase the number of properties that can be referenced in the preconfigured table. The size of the index may be calculated as $\log_2$ (number of configurations to be supported), where the number of configurations may correspond to the number of resources for sounding use. The use of an index requires that the table be preconfigured, typically by RRC signaling.

Figure 13:
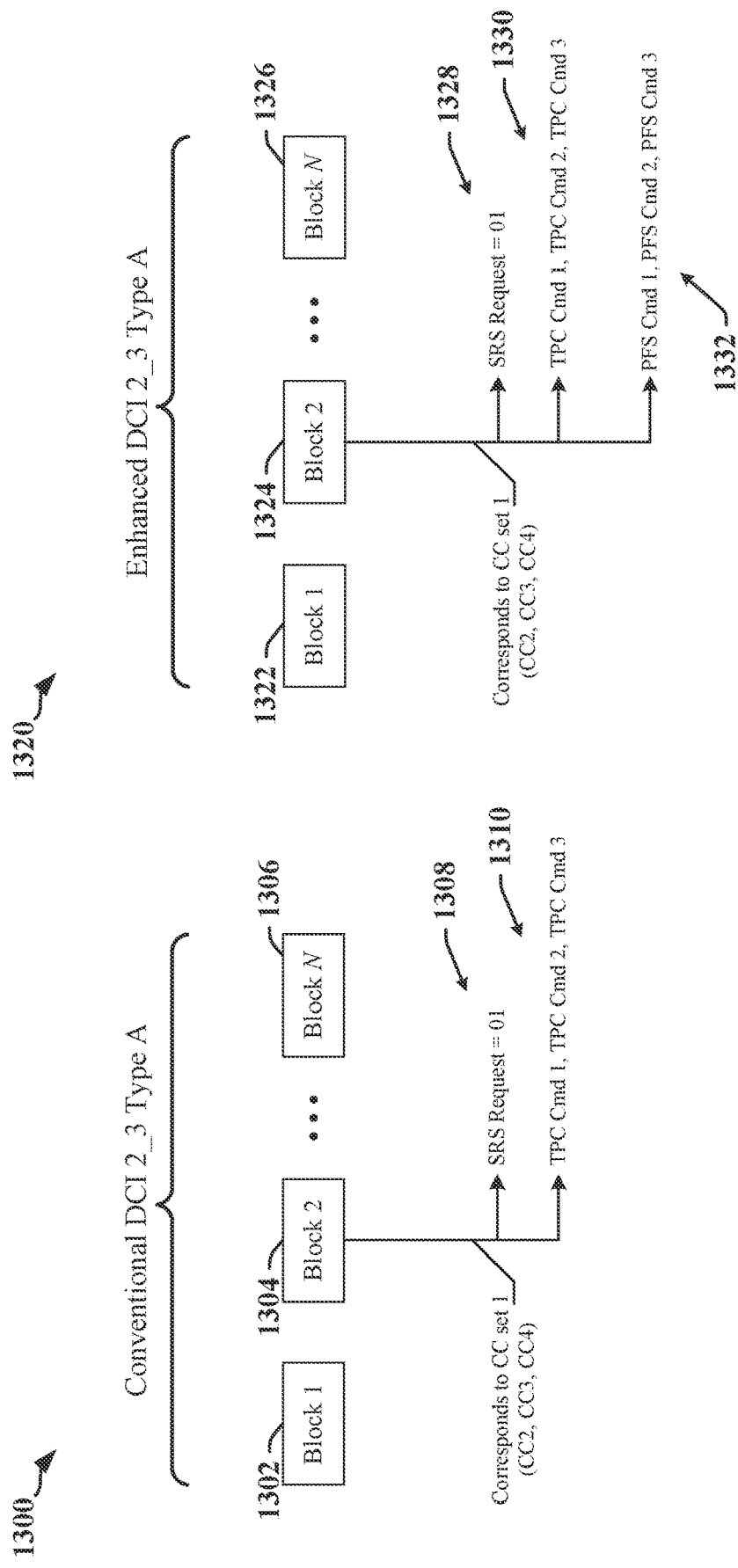
FIG. 13 illustrates a first example in which group common downlink control information (GC-DCI) may be adapted to support configuration of partial resource sounding in accordance with certain aspects of this disclosure.

In one aspect, an enhanced GC-DCI format may be used to inform the UE which frequency resources are to be used for partial frequency sounding. FIG. 13 illustrates a first example in which GC-DCI 2_3 Type A 1300 may be adapted to support configuration of partial resource sounding. GC-DCI Type A is used to provide triggers only for antenna switching. GC-DCI 2_3 Type A is used for wideband configuration and does not include information concerning frequency resources. GC-DCI Type A provides a block 1302, 1304, 1306 for each of N UEs or groups of UEs. Each block 1302, 1304, 1306 corresponds to a set of carrier frequencies and includes one or more different TPC entries 1310. An SRS request identifier 1308 is used to select a CC set (carrier frequency). The TPC entries 1310 includes an entry for each of the corresponding CC sets.

Figure 14:
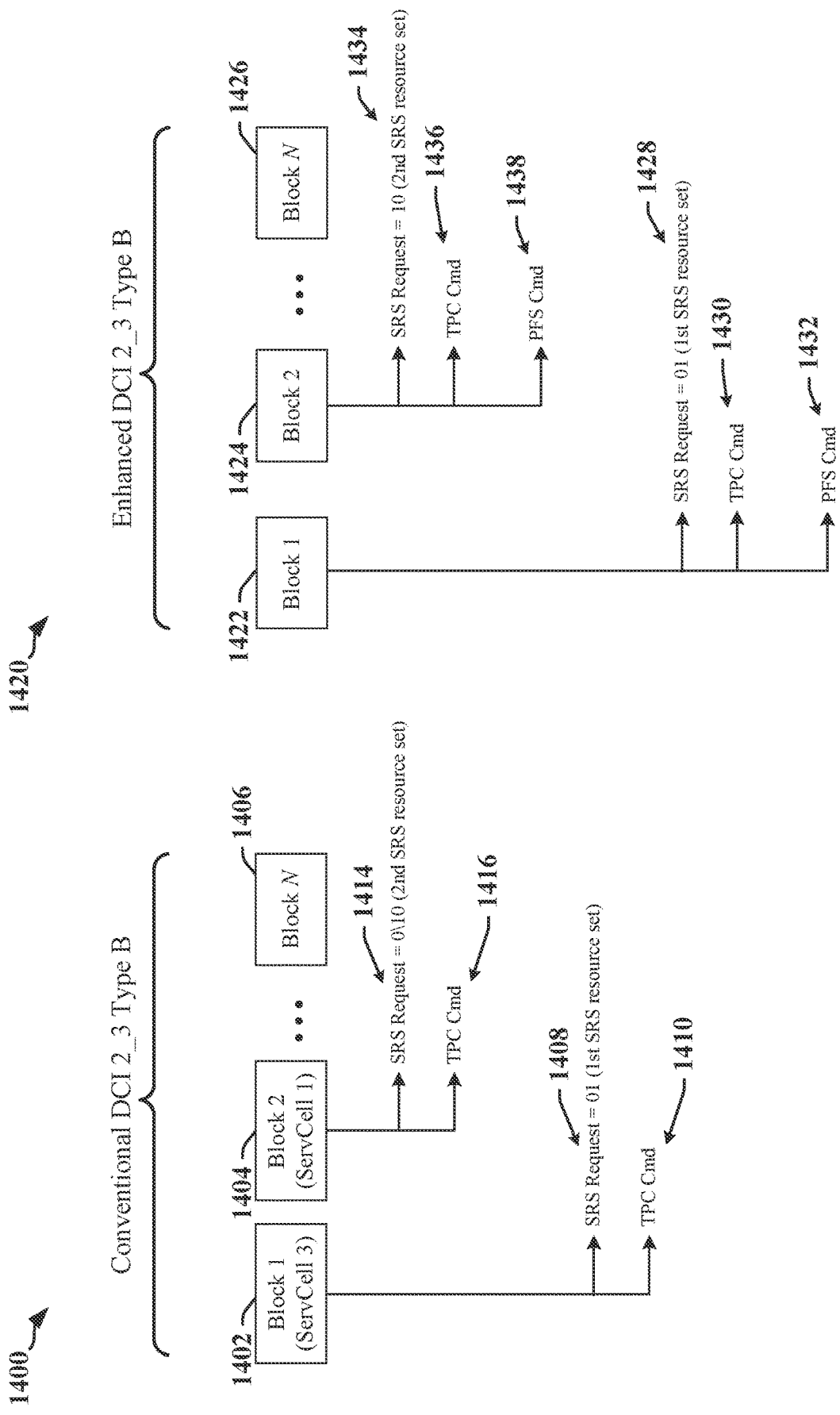
FIG. 14 illustrates a second example in which GC-DCI may be adapted to support configuration of partial resource sounding in accordance with certain aspects of this disclosure.

FIG. 14 illustrates a second example in which GC-DCI 2_3 Type B 1400 may be adapted to support configuration of partial resource sounding. GC-DCI Type B is used for wideband configuration to configure certain aspects of carrier frequency triggering. GC-DCI Type B includes information concerning frequency resources. GC-DCI Type B provides a block 1402, 1404, 1406 for N carrier frequencies. Each block 1402, 1404, 1406 corresponds to a single carrier frequency and includes a TPC entry 1410 for the corresponding carrier frequency. An SRS request identifier 1408 is used to select an individual CC (carrier frequency).

Both GC-DCI 2_3 type A and GC-DCI 2_3 type B are used for, or support wideband sounding. Certain aspects of this disclosure define a new field for GC-DCI to indicate sub-frequency resources to be sounded by UEs configured for partial frequency sounding. The bits of the new field can indicate explicitly the partial frequency resources to be used, or may be used as an index to a preconfigured table to indicate the partial frequency resources to be used.

FIG. 13 illustrates a first example of enhanced GC-DCI 1320 that is based on GC-DCI 2_3 Type A, and which supports configuration of partial resource sounding. Enhanced GC-DCI Type A provides a block 1322, 1324, 1326 for N UEs or groups of UEs. Each block 1322, 1324, 1326 corresponds to a set of carrier frequencies and includes one or more different TPC entries 1330. An SRS request identifier 1328 is used to select a CC set (carrier frequency). The TPC entries 1330 includes an entry for each of the corresponding CC sets.

In one aspect, partial frequency sounding commands (PFS commands 1332) may be configured for the corresponding CC sets. The PFS commands 1332 may include a bitmap or index to a preconfigured table. The bitmap or index may identify the SRS resources to be used by a UE for partial sounding. In one example, M bits are added to each block 1322, 1324, 1326 for every CC, for a total of M*(number of CCs in the CC set) bits that are used to indicate the sub frequency resources to be sounded within each CC. In another example, a 4-bit index may be used to index a table that includes 16 entries covering up to 4 CCs and 4 sub-frequency resources per block 1322, 1324, 1326. FIG. 14 illustrates a second example of enhanced GC-DCI 1420 that is based on GC-DCI 2_3 Type B, and which supports configuration of partial resource sounding. Enhanced GC-DCI Type B provides a block 1422, 1424, 1426 for N carrier frequencies. Each block 1422, 1424, 1426 corresponds to a single carrier frequency and includes a TPC entry 1430 for the corresponding carrier frequency. An SRS request identifier 1438 is used to select an individual CC (carrier frequency).

In one aspect, partial frequency sounding commands (PFS commands 1432) may be configured for the corresponding CC sets. The PFS commands 1432 may include a bitmap or index to a preconfigured table. The bitmap or index may identify the SRS resources to be used by a UE for partial sounding. In one example, M bits are added to each block 1422, 1424, 1426 for every CC, for a total of M*(number of CCs in the CC set) bits that are used to indicate the sub frequency resources to be sounded within each CC. In another example, a 4-bit index may be used to index a table that includes 16 entries covering up to 4 CCs and 4 sub-frequency resources per block 1422, 1424, 1426.

Figure 15:
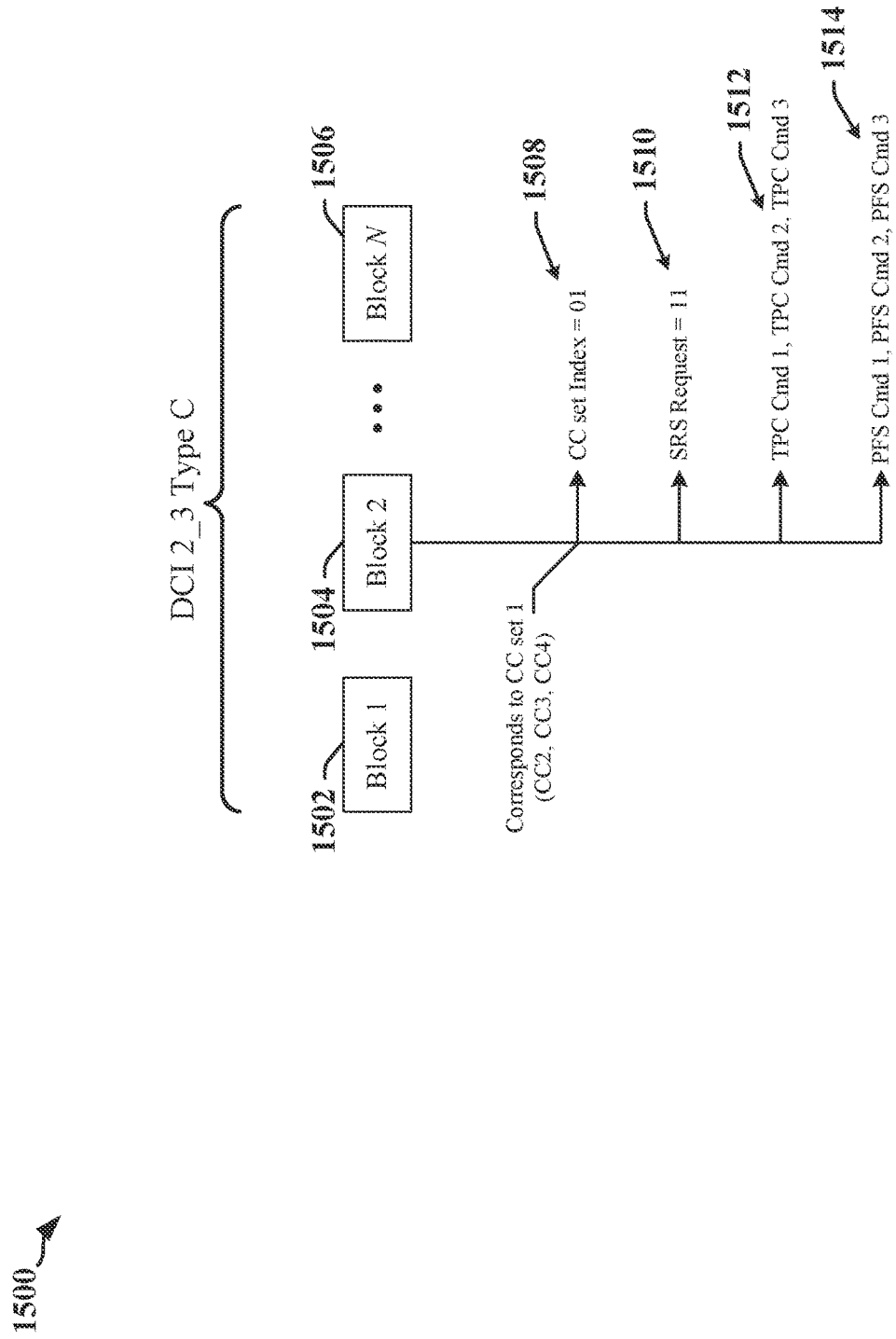
FIG. 15 illustrates a third example in which GC-DCI may be adapted to support configuration of partial resource sounding in accordance with certain aspects of this disclosure.

FIG. 15 illustrates a third example of enhanced GC-DCI 1500 that is based on GC-DCI 2_3 Type A, and which supports configuration of partial resource sounding. Enhanced GC-DCI 1500 provides a block 1502, 1504, 1506 for N UEs or groups of UEs. Each block 1502, 1504, 1506 corresponds to a set of carrier frequencies and includes one or more different TPC entries 1512. An SRS request identifier 1510 is used to select a CC set (carrier frequency). The TPC entries 1512 includes an entry for each of the corresponding CC sets.

In one aspect the enhanced GC-DCI 1500 includes a field a CC set identifier 1508 used to select an individual CC (carrier frequency) that can be used to trigger multiple CCs simultaneously. In another aspect, partial frequency sounding commands (PFS commands 1332) may be configured for the corresponding CC sets. The PFS commands 1332 may include a bitmap or index to a preconfigured table. The bitmap or index may identify the SRS resources to be used by a UE for partial sounding. In one example, M bits are added to each block 1522, 1524, 1526 for every CC, for a total of M*(number of CCs in the CC set) bits that are used to indicate the sub frequency resources to be sounded within each CC. In another example, a 4-bit index may be used to index a table that includes 16 entries covering up to 4 CCs and 4 sub-frequency resources per block 1522, 1524, 1526.

In another aspect, the SRS request identifier 1510 provides flexible SRS triggering for different SRS usages, including antenna switching for beam management, codebook, etc.

In another aspect, the PFS command field 1332, 1432, 1514 in enhanced GC-DCI carries a bitmap that can be used to select sub frequency resources to be sounded. The bitmap may directly identify the sub frequency resources. In the hopping example illustrated in FIG. 9, the first RB group 912 (also referred to as the first hop) includes 4 sub-hops which can be allocated among 4 UEs. In this example, each sub-hop includes a single RB 902, 904, 906, 908, although one or more sub-hops may include more than one of the RBs 902, 904, 906, 908. A first UE may be configured with a bitmap with the value '1000' indicating that the first UE can use the first sub-hop for sounding and that the remaining 3 sub-hops are unavailable or unused for sounding by the first UE.

In the non-hopping example illustrated in FIG. 10, the RBs allocated for SRS by the base station may be divided into four RB groups 1002, 1004, 1006, 1008, and each of the RB groups 1002, 1004, 1006, 1008 can be allocated for the use of different UEs. Each of the RB groups 1002, 1004, 1006, 1008 includes 4 RBs, although one or more of the RB groups 1002, 1004, 1006, 1008 may include more than four RBs. A first UE may be configured with a bitmap with the value '1000' indicating that the first UE can use the sub-band that includes the first RB group 1002 for sounding and that the remaining 3 RB groups 1004, 1006, 1008 are unavailable or unused for sounding by the first UE.

In some implementations, a bitmap provided by the PFS command field 1332, 1432, 1514 in enhanced GC-DCI carries is valid for all hops or transmissions. In some implementations, cycling within the hops can be indicated by RRC signaling. In one example, the bitmap may be cycled in a sequence such as {1000→0100→0010→0001→1000 . . . }.

In some instances, the bitmap may indicate that more than one sub-resource (sub-hop or sub-band) may be sounded. For example, a bitmap with the value '1001' indicates that the first UE can use the first and last sub-hops or the first and last sub-bands for sounding. The bitmap can support non-contiguous resource sounding including, for example, when the bit map has the value '1010' or '0101' for example.

In one aspect, the PFS command field 1332, 1432, 1514 in enhanced GC-DCI carries an index that indicates an entry in an RRC-configured table. The entry in the table may identify which sub-frequency resource (sub-hop or sub-band) is assigned to the corresponding UE to be sounded. In the 4-UE, 4 sub-frequency resources examples illustrated in FIGS. 9, 10 and 12, a 2-bit index is sufficient to indicate one of the four possible entries of pre-configured table. The use of an index can provide benefits over bitmaps when the sub-frequency resources are unequally split, when larger numbers of UEs are to be configured, and when it is desirable to increase the number of properties that can be referenced in the preconfigured table. The size of the index may be calculated as $\log_2$ (number of configurations to be supported), where the number of configurations may correspond to the number of resources for sounding use. The use of an index requires that the table be preconfigured, typically by RRC signaling.

Figure 16:
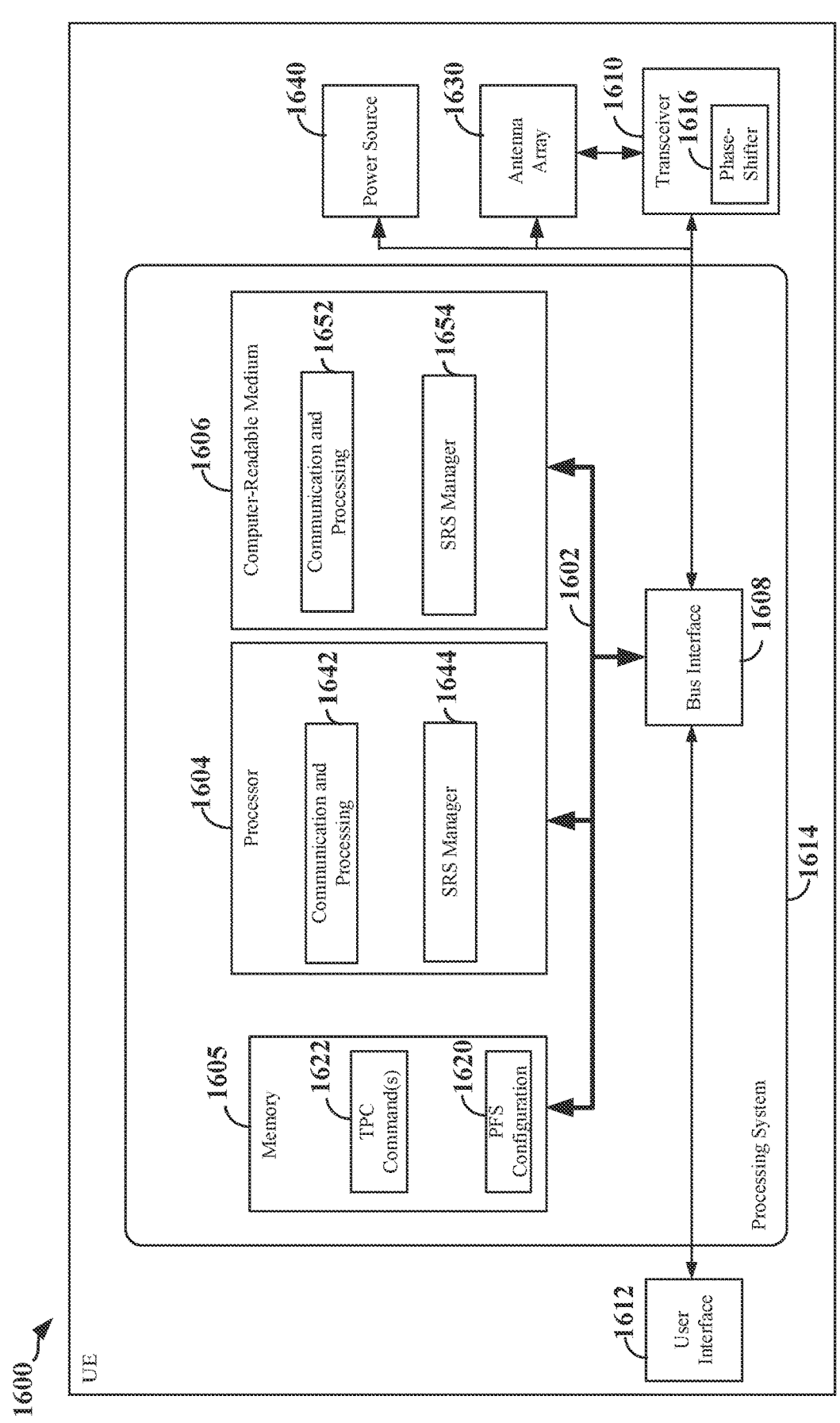
FIG. 16 is a block diagram illustrating an example of a hardware implementation for a UE employing a processing system according to some aspects.

FIG. 16 is a conceptual diagram illustrating an example of a hardware implementation for an exemplary UE 1600 employing a processing system 1614. For example, the UE 1600 may be any of the UEs or scheduled entities illustrated in any one or more of FIGS. 1, 3 and/or 4.

The UE 1600 may be implemented with a processing system 1614 that includes one or more processors 1604. Examples of processors 1604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1600 may be configured to perform any one or more of the functions described herein. That is, the processor 1604, as utilized in a UE 1600, may be used to implement any one or more of the processes described below in connection with FIG. 16.

The processor 1604 may in some instances be implemented via a baseband or modem chip and in other implementations, the processor 1604 may itself comprise a number of devices distinct and different from a baseband or modem chip (e.g., in such scenarios as may work in concert to achieve aspects discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1614 may be implemented with a bus architecture, represented generally by the bus 1602. The bus 1602 may include any number of interconnecting buses and bridges depending on the specific application of the processing system 1614 and the overall design constraints. The bus 1602 communicatively couples together various circuits including one or more processors (represented generally by the processor 1604), a memory 1605, and computer-readable media (represented generally by the computer-readable medium 1606). The bus 1602 may also link various other circuits such as timing sources, peripherals, voltage regulators, and power management circuits, which are well known in the art, and therefore, will not be described any further. A bus interface 1608 provides an interface between the bus 1602 and a transceiver 1610. The transceiver 1610 provides a means for communicating with various other apparatus over a transmission medium (e.g., air interface). In some examples, the transceiver 1610 may include a phase-shifter 1616 for digital and/or analog beamforming via one or more antenna array(s) 1630. A user interface 1612 (e.g., keypad, display, speaker, microphone, joystick) may also be provided.

The processor 1604 is responsible for managing the bus 1602 and general processing, including the execution of software stored on the computer-readable medium 1606. The software, when executed by the processor 1604, causes the processing system 1614 to perform the various functions described below for any particular apparatus. The computer-readable medium 1606 and the memory 1605 may also be used for storing data that is manipulated by the processor 1604 when executing software.

One or more processors 1604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1606.

The computer-readable medium 1606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1606 may reside in the processing system 1614, external to the processing system 1614, or distributed across multiple entities including the processing system 1614. The computer-readable medium 1606 may be embodied in a computer program product. In some examples, the computer-readable medium 1606 may be part of the memory 1605. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1604 may include circuitry configured for various functions. For example, the processor 1604 may include communication and processing circuitry 1642, configured to communicate with one or more radio access network (RAN) entities, such as one or more base stations (e.g., gNBs), and/or one or more scheduling entities. In some examples, the communication and processing circuitry 1642 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1642 may be configured to receive and process downlink beamformed signals at a mmWave frequency or a sub-6 GHz frequency via the transceiver 1610 and the antenna array 1630 (e.g., using the phase-shifter 1616). In addition, the communication and processing circuitry 1642 may be configured to generate and transmit uplink beamformed signals at a mmWave frequency or a sub-6 GHz frequency via the transceiver 1610 and antenna array 1630 (e.g., using the phase-shifter 1616).

The communication and processing circuitry 1642 may further be configured to execute communication and processing software 1652 stored in the computer-readable medium 1606 to implement one or more of the functions described herein.

The processor 1604 may further include SRS manager circuitry 1644, configured to process a partial frequency sounding configuration 1620 defined for one or more UEs. In some examples, the partial frequency sounding configuration 1620 may include an identification of certain resources to be used for transmitting SRS.

The SRS manager circuitry 1644 may further be configured to execute SRS manager software 1654 stored in the computer-readable medium 1606 to implement one or more of the functions described herein.

Figure 18:
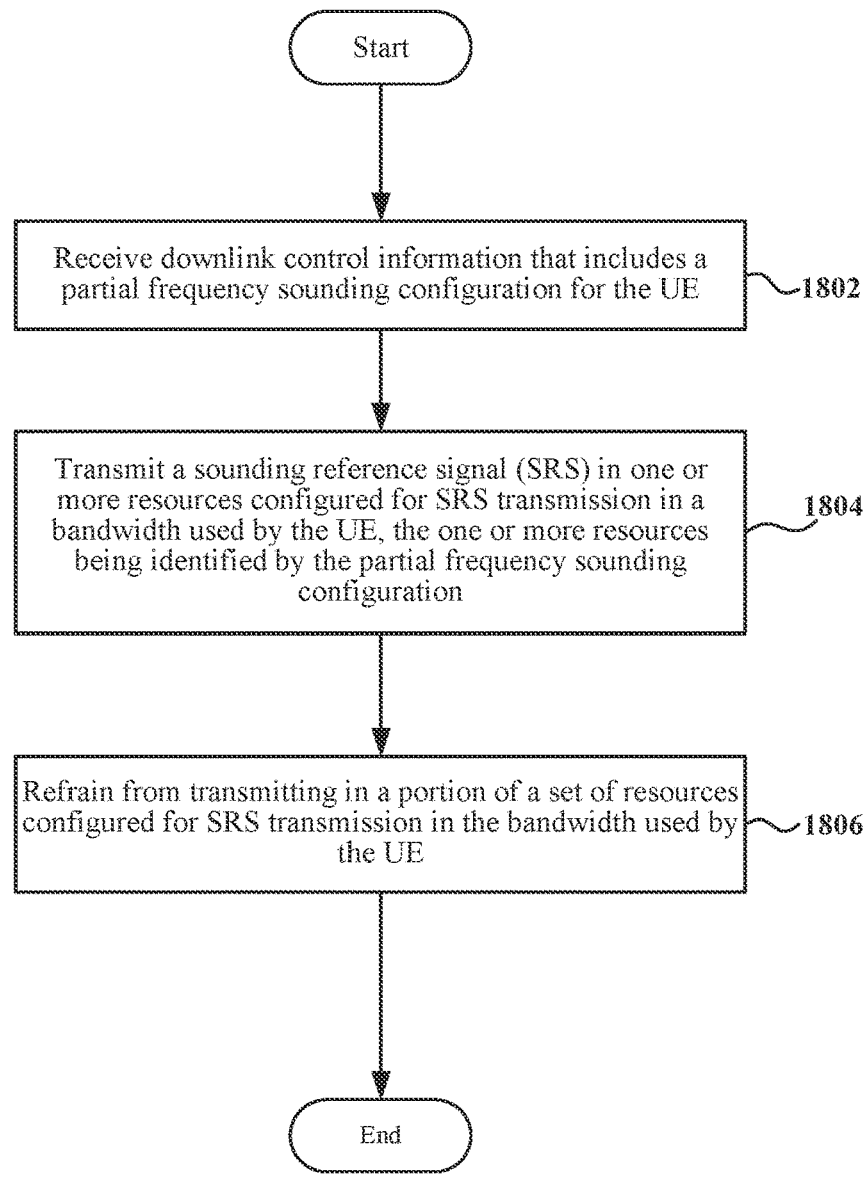
FIG. 18 is a flow chart of an exemplary method for a UE to utilize a multi-TRP SRS resource set according to some aspects.

In one configuration, the UE 1600 includes means for performing the various functions and processes described in relation to FIG. 18. In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 3, 4, and/or 7-10, and utilizing, for example, the processes and/or algorithms described herein in relation to FIG. 18.

Figure 17:
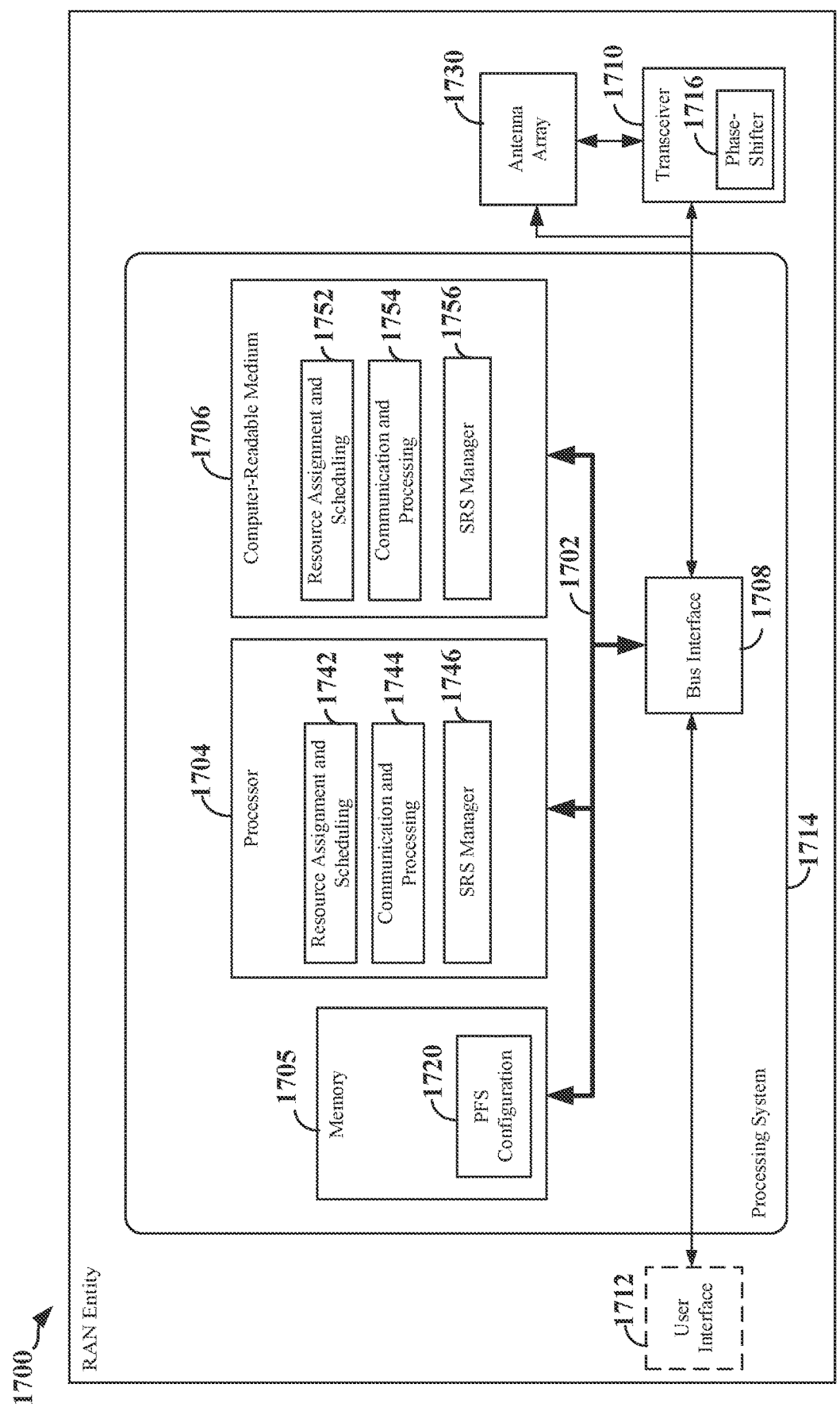
FIG. 17 is a block diagram illustrating an example of a hardware implementation for a radio access network (RAN) entity employing a processing system according to some aspects.

FIG. 17 is a conceptual diagram illustrating an example of a hardware implementation for an exemplary RAN entity 1700 employing a processing system 1714. For example, the RAN entity 1700 may correspond to any of the base stations (e.g., gNBs), TRPs (e.g., combined TRP and base station in a RRH configuration), or other scheduling entities illustrated in any one or more of FIGS. 1, 3, 4, and/or 7-10.

In accordance with various aspects of the disclosure, an element, or any portion of an element, or any combination of elements may be implemented with a processing system 1714 that includes one or more processors 1704. The processing system 1714 may be substantially the same as the processing system 1614 illustrated in FIG. 16, including a bus interface 1708, a bus 1702, memory 1705, a processor 1704, and a computer-readable medium 1706. Furthermore, the RAN entity 1700 may include an optional user interface 1712 and a transceiver 1710 substantially similar to those described above in FIG. 16. In some examples, the transceiver 1710 may include a phase-shifter 1716 for digital and/or analog beamforming via one or more antenna array(s) 1730. The processor 1704, as utilized in a RAN entity 1700, may be used to implement any one or more of the processes described below.

In some aspects of the disclosure, the processor 1704 may include circuitry configured for various functions. For example, the processor 1704 may include resource assignment and scheduling circuitry 1742, configured to generate, schedule, and modify a resource assignment or grant of time-frequency resources (e.g., a set of one or more resource elements). For example, the resource assignment and scheduling circuitry 1742 may schedule time-frequency resources within a plurality of time division duplex (TDD) and/or frequency division duplex (FDD) subframes, slots, and/or mini-slots to carry user data traffic and/or control information to and/or from multiple UEs.

In some examples, the resource assignment and scheduling circuitry 1742 may be configured to schedule resources for the transmission of an SRS configuration for a multi-TRP SRS resource set to a user equipment (UE) in communication with the RAN entity 1700. The resource assignment and scheduling circuitry 1742 may further be configured to schedule resources for the reception of one or more SRSs from the UE in accordance with the SRS configuration. The resource assignment and scheduling circuitry 1742 may further be configured to schedule resources for the transmission of DCI triggering the SRS configuration or a MAC-CE activating the SRS configuration. In addition, the resource assignment and scheduling circuitry 1742 may further be configured to schedule resources for the transmission of a TPC command to the UE. The resource assignment and scheduling circuitry 1742 may further be configured to execute resource assignment and scheduling software 1752 stored in the computer-readable medium 1706 to implement one or more of the functions described herein.

The processor 1704 may further include communication and processing circuitry 1744, configured to communicate with the UE. In some examples, the communication and processing circuitry 1744 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1744 may be configured to receive and process uplink beamformed signals at a mmWave frequency or a sub-6 GHz frequency via the transceiver 1710 and the antenna array 1730 (e.g., using the phase-shifter 1716). In addition, the communication and processing circuitry 1744 may be configured to generate and transmit uplink beamformed signals at a mmWave frequency or a sub-6 GHz frequency via the transceiver 1710 and antenna array 1730 (e.g., using the phase-shifter 1716).

The communication and processing circuitry 1744 may further be configured to transmit an SRS configuration 1720 for the multi-TRP SRS resource set to the UE. The multi-TRP SRS resource set may include a plurality of SRS resources associated with the multiple TRPs. The multiple TRPs may be separate base stations or RRHs of a same base station. In the former example, the RAN entity 1700 may correspond to one of the base stations. In the latter example, the RAN entity 1700 may be coupled to each of the multiple TRPs. In some examples, the multiple TRPs may be co-located or positioned at different geographic locations and may belong to the same cell or different cells.

The multi-TRP SRS resource set may be, for example, an aperiodic SRS resource set, periodic SRS resource set, or semi-persistent SRS resource set. In some examples, the SRS configuration may be transmitted within a RRC message. In some examples, the RRC message may include a single RRC configuration (e.g., a single RRC configuration information element (IE)) including the SRS configuration. In other examples, the RRC message may include multiple RRC configurations (e.g., multiple RRC configuration IEs), each including one of a plurality of TRP SRS configurations, each associated with one of the TRPs, where the plurality of TRP SRS configurations collectively form the SRS configuration. The communication and processing circuitry 1744 may further be configured to store the SRS configuration 1720 within, for example, the memory 1705.

The communication and processing circuitry 1744 may further be configured to transmit an activation/trigger for the multi-TRP SRS resource set. For example, the communication and processing circuitry 1744 may transmit DCI triggering an aperiodic multi-TRP SRS resource set or a MAC-CE activating a semi-persistent multi-TRP SRS resource set. In some examples, the communication and processing circuitry 1744 may be configured to transmit DCI including a codepoint triggering the SRS configuration (e.g., when the SRS configuration includes a single RRC configuration) or a codepoint triggering each of the plurality of TRP SRS configurations (e.g., when the SRS configuration includes multiple RRC configurations).

The communication and processing circuitry 1744 may further be configured to transmit at least one closed-loop TPC command to the UE. The TPC command may be for either PUSCH transmissions or SRS transmissions. For example, a TPC command for SRS may be received in DCI format 2_3. In some examples, the TPC command is associated with one of the TRPs. In other examples, the TPC command may be applicable to each of the TRPs. In addition, the communication and processing circuitry 1744 may be configured to transmit a timing advance command to the UE. The timing advance command indicates a timing advance to be applied by the UE to uplink signals transmitted to the TRPs within a TAG. Here, at least one of the TRPs in the TAG is associated with (e.g., part of) the RAN entity 1700. The communication and processing circuitry 1744 may further be configured to receive one or more SRSs in accordance with the SRS configuration. The communication and processing circuitry 1744 may further be configured to execute communication and processing software 1754 stored in the computer-readable medium 1706 to implement one or more of the functions described herein.

The processor 1704 may further include SRS manager circuitry 1746, configured to configure the SRS configuration for the multi-TRP SRS resource set for the UE. In some examples, the SRS configuration may include a common set of SRS resource set parameters for the multiple TRPs. For example, the multi-TRP SRS resource set may include one or more SRS resources that each include the same (common) SRS resource parameters (e.g., transmission comb structure, port(s), number of symbols, repetition, etc.). In other examples, the SRS configuration may include a respective set of SRS resource set parameters for each of the multiple TRPs. For example, the SRS configuration can include a plurality of TRP SRS configurations, each associated with a respective TRP, where each TRP SRS configuration includes different respective SRS resource parameters. Each TRP SRS configuration may configure one or more SRS resources associated with a particular TRP. Thus, each TRP SRS configuration may include the SRS resource set parameters configuring the particular SRS resources for that TRP.

In some examples, when each of the TRPs belongs to the same TAG and the QCL association for SRS resources configured for each of the TRPs is the same, the SRS manager circuitry 1746 can configure the SRS resources associated with the multiple TRPs to be located within consecutive symbols of a slot. In some examples, when two of the TRPs may belong to different TAGs or the QCL association for SRS resources configured for two of the TRPs is different, the SRS manager circuitry 1746 may be configured to determine a gap length of one or more symbols to be applied between the SRS resources associated with each of the TRPs. For example, the SRS manager circuitry 1746 may be configured to determine the gap length to be applied between a first set of SRS resources associated with a first TRP and a second set of SRS resources associated with a second TRP.

In some examples, when the TRPs belong to different TAGs, the SRS manager circuitry 1746 may set the gap length to accommodate a maximum timing advance difference that may occur between the TAGs. In other examples, when the QCL association between the SRS resources associated with each of the TRPs is different, the SRS manager circuitry 1746 may set the gap length based on a capability of the UE or as a common gap length configured for all UEs. In some examples, the SRS manager circuitry 1746 may transmit an indication of the gap length as part of the SRS resource configuration (e.g., within the SRS configuration 1720) or separately from the SRS configuration via the communication and processing circuitry 1744 and transceiver 1710.

The SRS manager circuitry 1746 may further receive and process each of the SRSs received from the UE to obtain respective measurements (e.g., RSRP, RSRQ, etc.) of each of the received SRSs for uplink beam management. The SRS manager circuitry 1746 may further be configured to execute SRS manager software 1756 stored in the computer-readable medium 1706 to implement one or more of the functions described herein.

Figure 19:
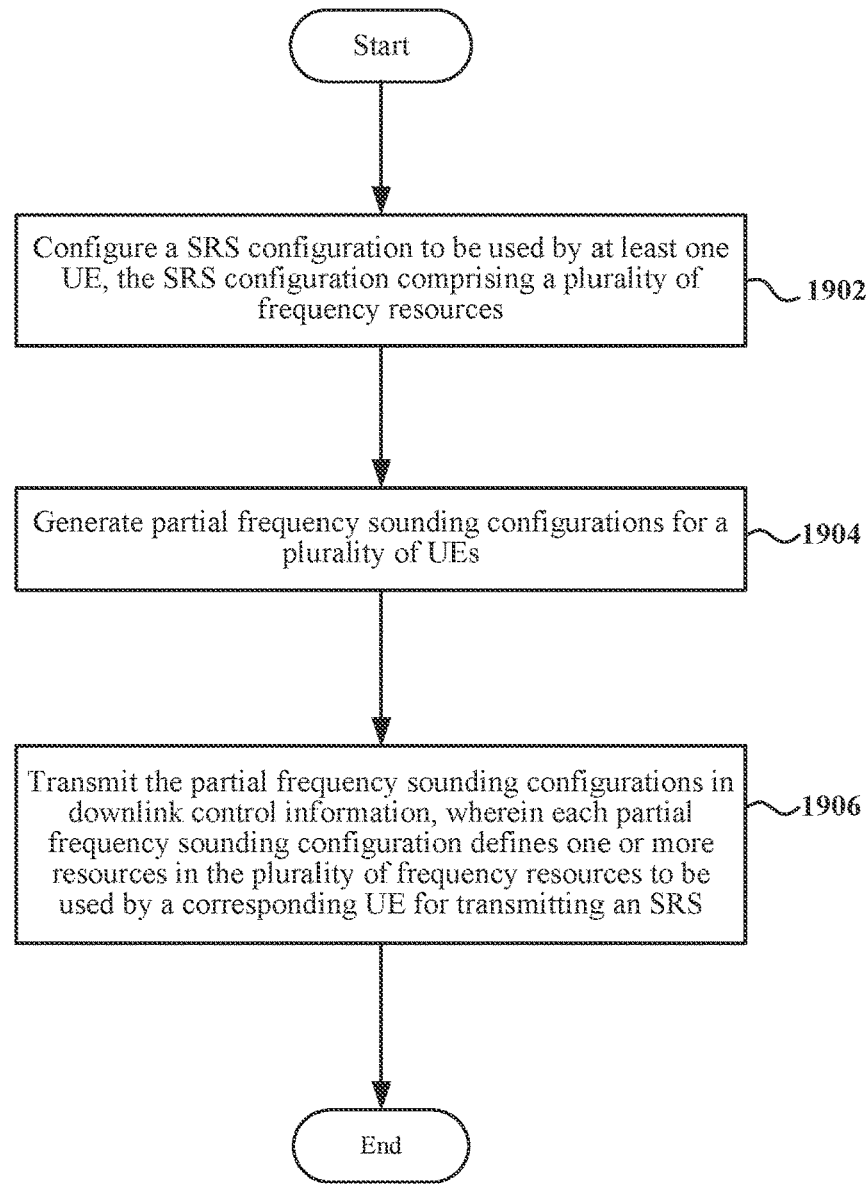
FIG. 19 is a flow chart of an exemplary method for a RAN entity to configure a multi-TRP SRS resource set according to some aspects.

In one configuration, the RAN entity 1700 includes means for performing the various functions and processes described in relation to FIG. 19. In one aspect, the aforementioned means may be the processor 1704 shown in FIG. 17 configured to perform the functions recited by the aforementioned means. In another aspect, the aforementioned means may be a circuit or any apparatus configured to perform the functions recited by the aforementioned means.

Of course, in the above examples, the circuitry included in the processor 1704 is merely provided as an example, and other means for carrying out the described functions may be included within various aspects of the present disclosure, including but not limited to the instructions stored in the computer-readable storage medium 1706, or any other suitable apparatus or means described in any one of the FIG. 1, 3 or 4 and utilizing, for example, the processes and/or algorithms described herein in relation to FIG. 19.

FIG. 18 is a flow chart 1800 illustrating an example of a method for a UE to utilize a partial frequency sounding configuration according to some aspects. As described below, some or all illustrated features may be omitted in a particular implementation within the scope of the present disclosure, and some illustrated features may not be required for implementation of all aspects. In some examples, the method may be performed by the UE 1600, as described above and illustrated in FIG. 16, by a processor or processing system, or by any suitable means for carrying out the described functions.

At block 1802, the UE may receive DCI that includes a partial frequency sounding configuration for the UE. At block 1804, the UE may transmit a SRS in one or more resources configured for SRS transmission in a bandwidth used by the UE. The one or more resources may be identified by the partial frequency sounding configuration. At block 1802, the UE may refrain from transmitting in a portion of a set of resources configured for SRS transmission in the bandwidth used by the UE.

In one example, the partial frequency sounding configuration includes a bitmap that includes a plurality of bits, each bit in the bitmap being mapped to a subset of the one or more resources.

In one example, the UE may identify the one or more resources configured for SRS transmission by the UE in a preconfigured table using an index provided in the partial frequency sounding configuration.

In one example, the downlink control information includes a block corresponding to the UE, the block including the partial frequency sounding configuration for the UE.

In certain examples, the downlink control information has a format that is based on GC-DCI defined for use in a 5G NR network. The format of the downlink control information may be based on GC-DCI 2_3 Type A and may include a partial frequency sounding field that includes a resource index used to identify the one or more resources in a preconfigured table, or includes a bitmap having a plurality of bits, each bit in the bitmap being mapped to a subset of the one or more resources. In some examples, the downlink control information further includes a component carrier index used to identify the component carrier set associated with the partial frequency sounding configuration in a list of component carrier sets. The format of the downlink control information may be based on GC-DCI 2_3 Type B and may include a partial frequency sounding field that includes a resource index used to identify the one or more resources in a preconfigured table, or includes a bitmap having a plurality of bits, each bit in the bitmap being mapped to a subset of the one or more resources.

In one example, the one or more resources configured for SRS transmission include a plurality of contiguous frequency resources within the bandwidth used by the UE.

In one example, the one or more resources configured for SRS transmission include a plurality of non-contiguous frequency resources within the bandwidth used by the UE.

In one example, the one or more resources configured for SRS transmission include frequency resources provisioned at different times.

FIG. 19 is a flow chart 1900 illustrating an example of a method for a RAN entity to configure a partial frequency sounding configuration for a plurality of UEs according to some aspects. As described below, some or all illustrated features may be omitted in a particular implementation within the scope of the present disclosure, and some illustrated features may not be required for implementation of all aspects. In some examples, the method may be performed by the RAN entity 1700, as described above and illustrated in FIG. 17, by a processor or processing system, or by any suitable means for carrying out the described functions.

At block 1902, the RAN entity may configure a SRS configuration to be used by at least one UE. The SRS configuration may include, provision or define a plurality of frequency resources. At block 1904, the RAN entity may generate partial frequency sounding configurations for a plurality of UEs. At block 1906, the RAN entity may transmit the partial frequency sounding configurations in DCI. Each partial frequency sounding configuration can define one or more resources in the plurality of frequency resources to be used by a corresponding UE for transmitting an SRS.

In one example, each partial frequency sounding configuration includes a bitmap that includes a plurality of bits, each bit in the bitmap being mapped to a subset of the one or more resources to be used by the corresponding UE for transmitting the SRS.

In one example, the RAN entity may configure each of the plurality of UEs with a table that defines the plurality of frequency resources and provide an index in each partial frequency sounding configuration. The index may identify the one or more resources in the corresponding preconfigured table.

In one example, the RAN entity may transmit each of the partial frequency sounding configurations in a block of the DCI that is identified with a corresponding UE.

In certain examples, the RAN entity may transmit the partial frequency sounding configurations in downlink control information that has a format that is based on GC-DCI defined for use in a 5G NR network. The format of the downlink control information may be based on GC-DCI 2_3 Type A and includes a partial frequency sounding field that includes a includes a resource index used to identify the one or more resources in a preconfigured table or a bitmap having a plurality of bits, each bit in the bitmap being mapped to a subset of the one or more resources. The DCI may include a component carrier index used to identify the component carrier set associated with the partial frequency sounding configuration in a list of component carrier sets. The list of component carrier sets may be included in the preconfigured table that identifies the one or more resources. The format of the DCI may be based on GC-DCI 2_3 Type B and may include a partial frequency sounding field that includes a partial frequency sounding field that includes a resource index used to identify the one or more resources in a preconfigured table or a bitmap having a plurality of bits, each bit in the bitmap being mapped to a subset of the one or more resources.

In one example, the one or more resources configured for SRS transmission include a plurality of contiguous frequency resources within the bandwidth used by the UE.

In one example, the one or more resources configured for SRS transmission include a plurality of non-contiguous frequency resources within the bandwidth used by the UE.

In one example, the one or more resources configured for SRS transmission include frequency resources provisioned at different times.

The following provides an overview of examples of the present disclosure.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3, 4, and/or 7-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method for wireless communication at a user equipment (UE) in a wireless communication network, the method comprising:
   receiving downlink control information that includes a partial frequency sounding configuration for the UE;
   transmitting a sounding reference signal (SRS) in one or more resources configured for SRS transmission in a bandwidth used by the UE, the one or more resources being identified by the partial frequency sounding configuration; and
   refraining from transmitting in a portion of a set of resources configured for SRS transmission in the bandwidth used by the UE;
   wherein the downlink control information has a format that is based on group common downlink control information (GC-DCI) defined for use in a fifth-generation new radio (5G NR) network;
   wherein the format of the downlink control information is based on GC-DCI 2_3 Type A and includes a partial frequency sounding field that includes a resource index used to identify the one or more resources in a preconfigured table, or includes a bitmap having a plurality of bits, each bit in the bitmap being mapped to a subset of the one or more resources.

2. The method of claim 1, wherein the downlink control information includes a component carrier index used to identify the component carrier set associated with the partial frequency sounding configuration in a list of component carrier sets.

3. A method for wireless communication at a user equipment (UE) in a wireless communication network, the method comprising:
   receiving downlink control information that includes a partial frequency sounding configuration for the UE;
   transmitting a sounding reference signal (SRS) in one or more resources configured for SRS transmission in a bandwidth used by the UE, the one or more resources being identified by the partial frequency sounding configuration; and
   refraining from transmitting in a portion of a set of resources configured for SRS transmission in the bandwidth used by the UE;
   wherein the downlink control information has a format that is based on group common downlink control information (GC-DCI) defined for use in a fifth-generation new radio (5G NR) network;
   wherein the format of the downlink control information is based on GC-DCI 2_3 Type B and includes a partial frequency sounding field that includes a resource index used to identify the one or more resources in a preconfigured table, or includes a bitmap having a plurality of bits, each bit in the bitmap being mapped to a subset of the one or more resources.

4. A method for wireless communication at a radio access network (RAN) entity in a wireless communication network, the method comprising:
   configuring a sounding reference signal (SRS) configuration to be used by at least one user equipment (UE), the SRS configuration comprising a plurality of frequency resources;
   generating partial frequency sounding configurations for a plurality of UEs;
   transmitting the partial frequency sounding configurations in downlink control information, wherein each partial frequency sounding configuration defines one or more resources in the plurality of frequency resources to be used by a corresponding UE for transmitting an SRS; and
   transmitting the partial frequency sounding configurations in downlink control information that has a format that is based on group common downlink control information (GC-DCI) defined for use in a fifth-generation new radio (5G NR) network;
   wherein the format of the downlink control information is based on GC-DCI 2_3 Type A and includes a partial frequency sounding field that includes a resource index used to identify the one or more resources in a preconfigured table, or includes a bitmap having a plurality of bits, each bit in the bitmap being mapped to a subset of the one or more resources.

5. The method of claim 4, wherein the downlink control information includes a component carrier index used to indicate the component carrier set associated with the partial frequency sounding configuration in a list of component carrier sets.

6. A method for wireless communication at a radio access network (RAN) entity in a wireless communication network, the method comprising:
   configuring a sounding reference signal (SRS) configuration to be used by at least one user equipment (UE), the SRS configuration comprising a plurality of frequency resources;
   generating partial frequency sounding configurations for a plurality of UEs;
   transmitting the partial frequency sounding configurations in downlink control information, wherein each partial frequency sounding configuration defines one or more resources in the plurality of frequency resources to be used by a corresponding UE for transmitting an SRS; and
   transmitting the partial frequency sounding configurations in downlink control information that has a format that is based on group common downlink control information (GC-DCI) defined for use in a fifth-generation new radio (5G NR) network;
   wherein the format of the downlink control information is based on GC-DCI 2_3 Type B and includes a partial frequency sounding field that includes a resource index used to identify the one or more resources in a preconfigured table, or includes a bitmap having a plurality of bits, each bit in the bitmap being mapped to a subset of the one or more resources.

7. A user equipment (UE) configured for wireless communication, comprising:
   one or more processors; and
   one or more memories coupled to the one or more processors, the one more processors and the one or more memories configured to:
      receive downlink control information that includes a partial frequency sounding configuration for the UE;
      transmit a sounding reference signal (SRS) in one or more resources configured for SRS transmission in a bandwidth used by the UE, the one or more resources being identified by the partial frequency sounding configuration; and
      refrain from transmitting in a portion of a set of resources configured for SRS transmission in the bandwidth used by the UE;
      wherein the downlink control information has a format that is based on group common downlink control information (GC-DCI) defined for use in a fifth-generation new radio (5G NR) network;

wherein the format of the downlink control information is based on GC-DCI 2_3 Type A and includes a partial frequency sounding field that includes a resource index used to identify the one or more resources in a preconfigured table, or includes a bitmap having a plurality of bits, each bit in the bitmap being mapped to a subset of the one or more resources.

8. A user equipment (UE) configured for wireless communication, comprising:
one or more processors; and
one or more memories coupled to the one or more processors, the one more processors and the one or more memories configured to:
receive downlink control information that includes a partial frequency sounding configuration for the UE;
transmit a sounding reference signal (SRS) in one or more resources configured for SRS transmission in a bandwidth used by the UE, the one or more resources being identified by the partial frequency sounding configuration; and
refrain from transmitting in a portion of a set of resources configured for SRS transmission in the bandwidth used by the UE;
wherein the downlink control information has a format that is based on group common downlink control information (GC-DCI) defined for use in a fifth-generation new radio (5G NR) network;
wherein the format of the downlink control information is based on GC-DCI 2_3 Type B and includes a partial frequency sounding field that includes a resource index used to identify the one or more resources in a preconfigured table, or includes a bitmap having a plurality of bits, each bit in the bitmap being mapped to a subset of the one or more resources.

9. A radio access network (RAN) entity configured for wireless communication, comprising:
one or more processors; and
one or more memories coupled to the one or more processors, the one or more processors and the one or more memories configured to:
configure a sounding reference signal (SRS) configuration to be used by at least one user equipment (UE), the SRS configuration comprising a plurality of frequency resources;
generate partial frequency sounding configurations for a plurality of UEs;
transmit the partial frequency sounding configurations in downlink control information, wherein each partial frequency sounding configuration defines one or more resources in the plurality of frequency resources to be used by a corresponding UE for transmitting an SRS; and
transmit the partial frequency sounding configurations in downlink control information that has a format that is based on group common downlink control information (GC-DCI) defined for use in a fifth-generation new radio (5G NR) network;
wherein the format of the downlink control information is based on GC-DCI 2_3 Type A and includes a partial frequency sounding field that includes a resource index used to identify the one or more resources in a preconfigured table, or includes a bitmap having a plurality of bits, each bit in the bitmap being mapped to a subset of the one or more resources.

10. A radio access network (RAN) entity configured for wireless communication, comprising:
one or more processors; and
one or more memories coupled to the one or more processors, the one or more processors and the one or more memories configured to:
configure a sounding reference signal (SRS) configuration to be used by at least one user equipment (UE), the SRS configuration comprising a plurality of frequency resources;
generate partial frequency sounding configurations for a plurality of UEs;
transmit the partial frequency sounding configurations in downlink control information, wherein each partial frequency sounding configuration defines one or more resources in the plurality of frequency resources to be used by a corresponding UE for transmitting an SRS; and
transmit the partial frequency sounding configurations in downlink control information that has a format that is based on group common downlink control information (GC-DCI) defined for use in a fifth-generation new radio (5G NR) network;
wherein the format of the downlink control information is based on GC-DCI 2_3 Type B and includes a partial frequency sounding field that includes a resource index used to identify the one or more resources in a preconfigured table, or includes a bitmap having a plurality of bits, each bit in the bitmap being mapped to a subset of the one or more resources.

* * * * *